United States Patent [19]

Saadé et al.

[11] Patent Number: 4,567,574
[45] Date of Patent: Jan. 28, 1986

[54] OPTIMIZING COBOL OBJECT CODE INSTRUCTION PATH LENGTH WITH RESPECT TO PERFORM STATEMENTS

[75] Inventors: Henry Y. Saadé, San Jose; William N. J. Tindall, San Martin, both of Calif.

[73] Assignee: International Business Machines Corporation, Armonk, N.Y.

[21] Appl. No.: 474,909

[22] Filed: Mar. 14, 1983

[51] Int. Cl.[4] .......................... G06F 9/00; G06F 9/30
[52] U.S. Cl. ..................................... 364/900; 364/300
[58] Field of Search ................ 364/300, 200 MS File, 364/900 MS File

[56] References Cited

U.S. PATENT DOCUMENTS 4,435,753 3/1984 Rizzi .................................. 364/300
4,454,579 6/1984 Pilat et al. .......................... 364/200

Primary Examiner—James D. Thomas
Assistant Examiner—William G. Niessen
Attorney, Agent, or Firm—Shelley M. Beckstrand; R. Bruce Brodie

[57] ABSTRACT

A method for optimizing instruction path lengths in a compilation of COBOL source code with reference to PERFORM statements requires a two-step procedure in which the control transfer relationship among the PERFORM statements and associated procedures is characterized as a vector of attributes, and a second step in which the vectors are interpreted for any given PERFORM statement such that, where indicated, the code of the procedure or simplified linkage code will be substituted for the PERFORM statement.

3 Claims, 23 Drawing Figures

PERFORM ANALYSIS

OPTIMIZING COBOL OBJECT CODE INSTRUCTION PATH LENGTH WITH RESPECT TO PERFORM STATEMENTS

TECHNICAL FIELD

This invention relates to a method for optimizing the instruction path length of COBOL object code with respect to PERFORM statements embedded in a source code stream.

BACKGROUND OF THE INVENTION

As pointed out by Pratt, "Programming Languages Design and Implementation", Prentice Hall, Inc., 1975, pp. 360–384, COBOL is a high-level language widely used since the early 1960's primarily for business applications of computers. An important characteristic is its English-like syntax of language statements. Sequence control in COBOL includes a statement label such as GOTO, an IF-THEN-ELSE construct, and a PERFORM statement. This PERFORM statement serves both as a simple subprogram call statement and an iteration statement. The PERFORM statement provides a call return structure without change in referencing environment. Relatedly, the translation of COBOL into efficient executable code is a complex compilation problem.

Whether or not the PERFORM statement is iterative, it invokes a parameterless subroutine call. The call is explicit while the return is implicit. Associated with the call or name is a procedure in the nature of a subroutine. The procedures may be either "open" or "closed". An "open" procedure is a sequence any of whose statements may be branched to externally, while a "closed" procedure is a sequence only preselected ones of whose statements may be branched to externally. Note that "open" procedures may be reached in a variety of ways. In addition to calling or branching, an "open" procedure may be accessed by "falling through" another procedure. Thus, after the last statement of a first procedure, the first statement of a second procedure in a contiguous address is then invoked.

A PERFORM statement can occur within the procedure associated with another PERFORM statement. The PERFORM statement that is nested within the procedure associated with the other PERFORM statement is "called by" the other PERFORM statement. It is usually true that the PERFORM statements which are most deeply nested in this way are also the most frequently invoked and thus merit preferential treatment during the compilation.

SUMMARY OF THE INVENTION

It is an object of this invention to reduce the instruction path length of COBOL object code with respect to PERFORM statements. This is, in part, achieved by recognizing the control transfer relations among PERFORM statements and associated procedures and noting whether the associated procedures are open or closed, and substituting either the procedure code itself for the PERFORM statement if the procedure is closed, or substituting a simplified call and return linkage mechanism if the procedure is open. Also, where multiple PERFORM statements share an associated procedure, consideration is given to the fact that multiple procedure code replacement for the PERFORM statement might result in undue code expansion. Consequently, where an associated procedure is referenced by multiple PERFORM statements, a substitution will only be made if the code expansion does not exceed a predetermined threshold and the procedure does not contain any external or user-provided labels. In addition, where a simplified call and return mechanism is substituted for the PERFORM statement, preference is given to those PERFORM statements that are most deeply nested within the procedures associated with other PERFORM statements. The nested PERFORM statement is typically invoked more frequently than the nesting PERFORM statement, particularly when the nesting PERFORM statement is iterative.

DESCRIPTION OF THE PREFERRED EMBODIMENT

Figure 1:
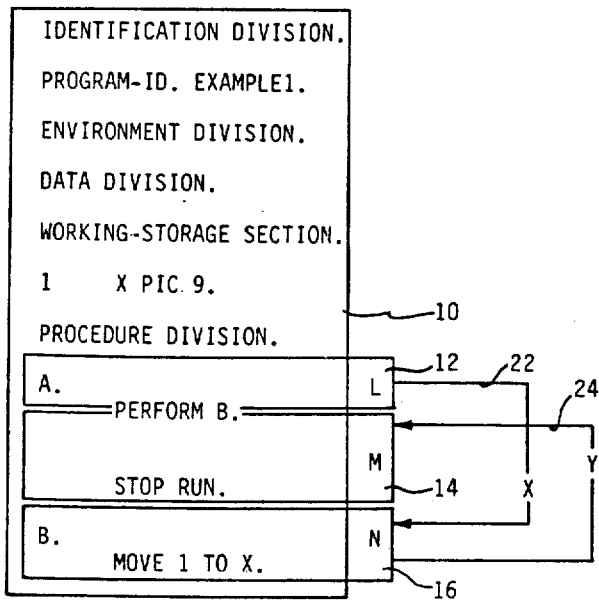
FIG. 1 is a diagrammatic illustration of a COBOL source code list including a PERFORM statement.

Program optimization is a process whereby the translated form of a computer program is improved in some respects. Optimization is usually an integral part of translation or compilation of a source program. Typically, the improvements have the effect of making the program execute faster. Optimization strategies include: (1) removing altogether instructions that can be determined to be unnecessary, and (2) replacing a slow sequence of instructions with an equivalent but faster sequence. The PERFORM optimization process of the invention accomplishes both.

Basic blocks of a program are maximal sequences of instructions such that if the first instruction is executed then it follows that every instruction in the sequence must also be executed. Thus, there is one entry to the sequence of instructions, and one exit after the last instruction in the sequence.

A control flow graph is used to represent the flow of control among program statements. The nodes of the graph are basic blocks. If control can pass from basic block "A" to basic block "B", there is an edge in the graph going from node A to node B. B is A's "successor"; A is B's "predecessor". A basic block, or statement, to which control can pass, is said to be "reachable".

There exist several different varieties of PERFORM statements. The optimization procedure of the invention will be described with respect to one of these, the Format 1 PERFORM statement. The procedure works correctly, however, on all PERFORM statements. Format 2 is an iterative PERFORM, which repeats the PERFORMed procedure a specified number of times, unconditionally. Format 3 repeats the PERFORMed procedure until or while a condition exists. Format 4 repeats the PERFORMed procedure until or while a condition exists, and at the same increments or decrements one or more control variables.

Referring to Table 1, before preceding to an explanation of the optimization procedure of the invention, a general-case PERFORM linkage mechanism will be described using code generated for an IBM System/370 computer, which is described in *IBM System/370 Principles of Operation*, GA22-7000, and *OS/VS-DOS/VS-VM/370 Assembler Language*, GC33-4010, both publications of the I.B.M. Corporation.

TABLE 1

FORMAT 1 PERFORM LINKAGE MECHANISM

| | SOURCE LANGUAGE | GENERATED LINKAGE MECHANISM | | |
|---|---|---|---|---|
| 1 | PERFORM P1 THRU P2 | | MVC | PFSV,VN |
| 2 | | | LA | R,GNret |
| 3 | | | ST | R,VN |
| 4 | | | B | P1 |
| 5 | | GNret | EQU | * |
| 6 | | | MVC | VN,PFSV |
| 7 | P0 ... | P0 | EQU | * |
| 8 | | | ... | |
| 9 | P1 ... | P1 | EQU | * |
| 10 | | | | |
| 11 | P2 ... | P2 | EQU | * |
| 12 | | | ... | |
| 13 | | | L | R,VN |
| 14 | | | BR | R |
| 15 | P3 ... | P3 | EQU | * |
| 16 | | | ... | |
| 17 | | PFSV | DS | AL4 |
| 18 | | VN | DC | A(P3) |

In the Tables, System/370 instructions used include move character (MVC) load address (LA), store (ST), branch (B), equate (EQU), load (L), branch register (BR), define storage (DS), define constant (DC), branch and link (BAL), and branch and link register (BALR). The function and purpose of the linkage mechanism of Table 1 is as follows. At line 1, the current value of the variable name cell (VN) is saved in a PERFORM save cell (PFSV). This copies the contents of storage defined by line 18 (the VN cell) into storage defined by line 17 (the PERFORM save cell). There is one VN for each procedure name appearing as the last or only procedure name of a PERFORM statement, which in this case is P2. There is one PERFORM save cell for each PERFORM statement in the source language program, which in this case is the PERFORM at line 1. The VN is initialized to point to the statement immediately following the last statement of the PERFORMed procedure. In Table 1, the VN initially points to the statement at P3 (line 15). Thus, if the last statement of the PERFORMed procedure at P2 can be reached (such as by GO TO or fall through), without having explicitly set the VN, control will simply pass to the next sequential statement at P3.

In Table 1, lines 13 and 14 constitute the PERFORM return, and line 18, the VN.

This save and restore mechanism also permits two different PERFORM statements to share the same VN, even when one of the PERFORM statements is a part of the other's PERFORMed procedure. The subsequent PERFORM statement saves and restores the VN value that the earlier PERFORM statement has set.

At lines 2 and 3 of Table 1, the value of the VN is set so that after the last statement of the PERFORMed procedure P1, P2 has been executed, control will return to the instruction after the label "GNret". At line 4, control is transferred to the first statement of the PERFORMed procedure at P1. Lines 5-6 are the PERFORM epilogue. The value of VN, saved at the earlier MVC (line 1), is restored to what it was before the PERFORM statement was executed (the address of statement P3). At lines 13 and 14, following execution of the procedure P1,P2, control is returned to the epilogue (line 5) of the PERFORM statement, where the original value of the VN will be restored.

Pursuant to the invention, under some circumstances, not one of the linkage instruction in Table 1 is required. In accordance with the invention, the special cases in which optimized linkages can be used in connection with compiled PERFORM statements or procedures are represented in terms of four Boolean variables: MOVE, COPY, SAVE, and Branch-and-link (BAL). Each such Boolean variable can take the values YES or NO. The initial settings are MOVE is YES, COPY is YES, BAL is YES, and SAVE is NO. There is one set of these Boolean variables for each PERFORM statement in the program. The circumstances under which MOVE, COPY, and BAL remain set to YES, and SAVE to NO, as well as the transformations that can then be made, will next be summarized.

Move remains set to YES if a procedure is PERFORMed by only the single PERFORM statement, and there is no way that control can pass to the procedure other than be executing this PERFORM statement. Under these conditions, the PERFORM statement can be completely replaced by the (no longer) PERFORMed procedure. This transformation is referred to as "procedure integration". The procedure is deleted from its original position.

Copy remains set to YES for each of several PERFORM statements whose common PERFORMed procedure contains no compiler-generated or user-provided labels, and is not too large. Under these conditions, the PERFORM statements can be completely replaced by copies of the (no longer) PERFORMed procedure. If there is no way that control can pass to the procedure, other than by executing one of these PERFORM statements, the procedure is deleted from its original position. Otherwise, a copy of the procedure must remain at its original position.

SAVE remains set to NO for a given PERFORM statement if both (1) control can not fall through the last statement of its PERFORMed procedure to the statement immediately following the PERFORMed procedure; and (2) there is not another PERFORM statement whose PERFORMed procedure has the same last statement as that of the given PERFORM statement (also referred to as having the same end of range), such that control can pass from either PERFORM statement to the other without first passing to this last statement. Under these circumstances the value of the VN does not have to be saved and restored.

BAL remains set to YES if the interconnections between the given PERFORM statement and any other PERFORM statements permit the BAL linkage to be used in place of the standard linkage. This will be further described hereinafter. At its best, this involves only a single instruction at the PERFORM statement and another at the end of the PERFORMed procedure. With a group of nested PERFORMed procedures, only the innermost procedure can use this short-form linkage.

In Tables 2-6, code sequences for each PERFORM format are illustrated for the valid combinations of Boolean variables which can be detected. In these tables, RL denotes the linkage register, the usual choice for which in System/370 architecture is register 15.

Table 2 illustrates Type 0 optimized linkage, or procedure integration. This is the result when MOVE or COPY is YES. SAVE and BAL may be anything. There are no instructions in Table 2, and thus is the most efficient. Procedures P1 and P2 are copied into the location of the PERFORM and deleted from their previous position in the text stream.

Table 3 illustrates Type 1 optimized linkage. MOVE and COPY are NO, and BAL is YES, and SAVE is NO. In table 3, two instructions do what standard linkage requires seven instructions to do.

Table 4 illustrates Type 2 optimized linkage. MOVE and COPY are NO, and BAL is NO, and SAVE is NO. This linkage type eliminates the two expensive MVC instructions from the standard linkage.

Table 5 illustrates Type 3 optimized linkage. MOVE and COPY are NO, and BAL is YES, and SAVE is YES. In this linkage type, the two expensive MVC instructions of the standard linkage are eliminated at the cost of a relatively efficient (or cheap) ST instruction.

Table 6 illustrates standard linkage. MOVE and COPY are NO, and BAL is NO, and SAVE is YES.

In each of Tables 1-6, P0, P1, P2, P3, represent labels in the code, and the ellipses ( . . . ) represent some sequence of code statements.

TABLE 2

| TYPE 0 OPTIMIZED LINKAGE (PROCEDURE INTEGRATION) | | | |
|---|---|---|---|
| SOURCE LANGUAGE | GENERATED LINKAGE MECHANISM | | |
| PERFORM P1 THRU P2 | P1 | EQU | * |
| | | ... | |
| | P2 | EQU | * |
| P0 ... | P0 | EQU | * |
| P1 ... | | ... | |
| P2 ... | | | |
| P3 ... | P3 | EQU | * |
| | | ... | |

TABLE 3

| TYPE 1 OPTIMIZED LINKAGE | | | |
|---|---|---|---|
| SOURCE LANGUAGE | GENERATED LINKAGE MECHANISM | | |
| PERFORM P1 | | | |

TABLE 3-continued

| TYPE 1 OPTIMIZED LINKAGE | | | |
|---|---|---|---|
| SOURCE LANGUAGE | GENERATED LINKAGE MECHANISM | | |
| THRU P2 | | BAL | RL,P1 |
| P0 ... | P0 | EQU | * |
| P1 ... | P1 | EQU | * |
| P2 ... | P2 | EQU | * |
| | | BR | RL |
| P3 ... | P3 | EQU | * |
| | | ... | |

TABLE 4

| TYPE 2 OPTIMIZED LINKAGE | | | |
|---|---|---|---|
| SOURCE LANGUAGE | GENERATED LINKAGE MECHANISM | | |
| PERFORM P1 THRU P2 | | LA | R,GNret |
| | | ST | R,VN |
| | | B | P1 |
| | GNret | EQU | * |
| P0 ... | P0 | EQU | * |
| P1 ... | P1 | EQU | * |
| P2 ... | P2 | EQU | * |
| | | L | R,VN |
| | | BR | R |
| P3 ... | P3 | EQU | * |
| | | ... | |

TABLE 5

| TYPE 3 OPTIMIZED LINKAGE | | | |
|---|---|---|---|
| SOURCE LANGUAGE | GENERATED LINKAGE MECHANISM | | |
| PERFORM P1 THRU P2 | | LA | R,GNret |
| | | ST | R,VN |
| | | B | P1 |
| | GNret | EQU | * |
| | | ST | RL,VN |
| P0 ... | P0 | EQU | * |
| P1 ... | P1 | EQU | * |
| P2 ... | P2 | EQU | * |
| | | L | R,VN |
| | | BALR | RL,R |
| P3 ... | P3 | EQU | * |
| | | ... | |

TABLE 6

| STANDARD LINKAGE | | | |
|---|---|---|---|
| SOURCE LANGUAGE | GENERATED LINKAGE MECHANISM | | |
| PERFORM P1 THRU P2 | | MVC | PFSV,VN |
| | | LA | R,GNret |
| | | ST | R,VN |
| | | B | P1 |
| | GNret | EQU | * |
| | | MVC | VN,PFSV |
| P0 ... | P0 | EQU | * |
| P1 ... | P1 | EQU | * |
| P2 ... | P2 | EQU | * |
| | | L | R,VN |

TABLE 6-continued

| SOURCE LANGUAGE | STANDARD LINKAGE GENERATED LINKAGE MECHANISM | |
|---|---|---|
| P3 ... | P3 | BR R<br>EQU *<br>... |

Figures 8, 9:
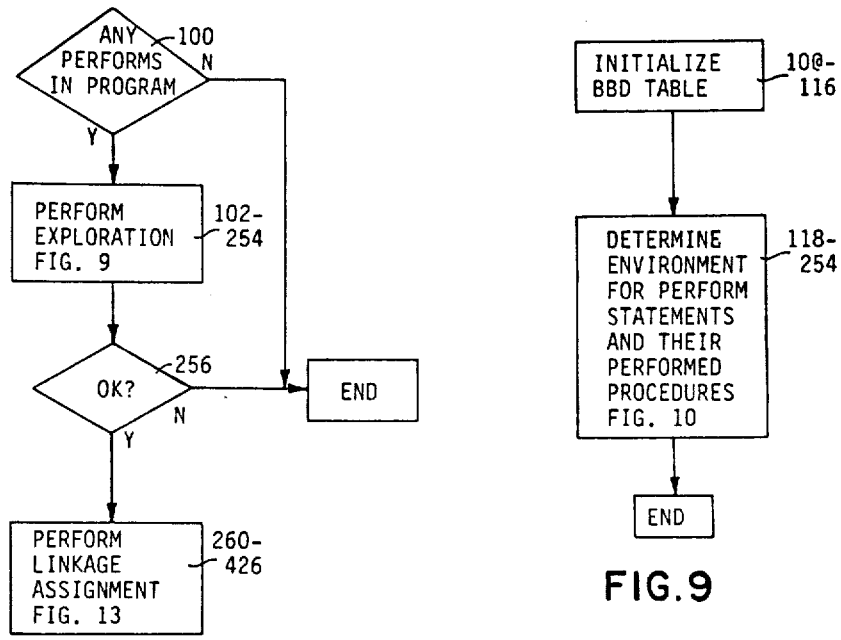
FIG. 8 provides a high-level description of PERFORM analysis.
FIGS. 9–11 illustrate the control structures for PERFORM exploration.
Figure 10:
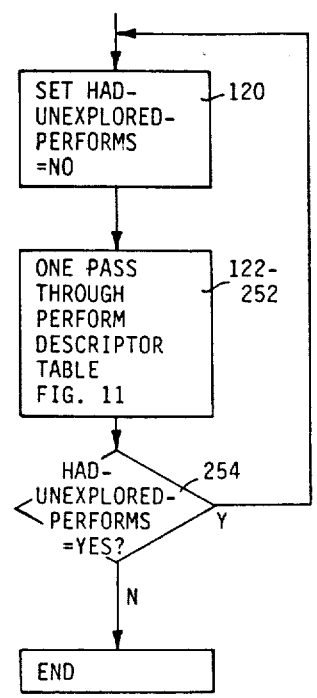
Figure 11:
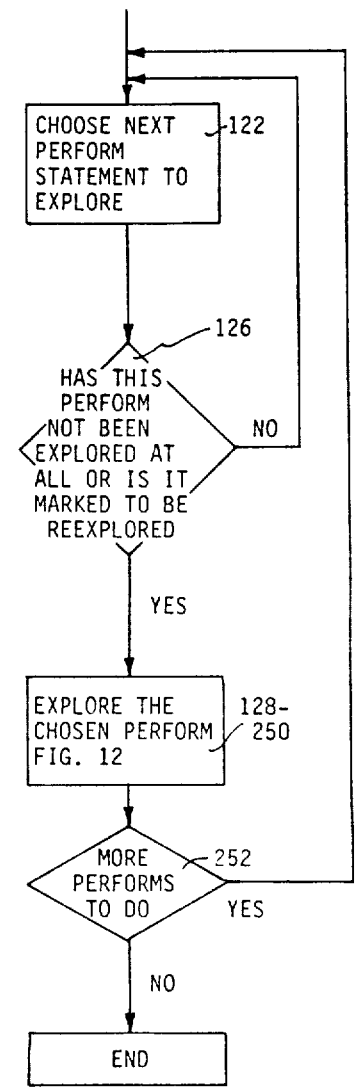

According to the invention, PERFORM optimization comprises PERFORM analysis (FIG. 8), followed by PERFORM transformation, which is a response to the quantities determined during PERFORM analysis. PERFORM transformation includes PERFORM statement transformation (FIG. 3) and PERFORM return transformation (FIG. 4). During a previous phase of the compiler, as will be described hereafter in connection with Tables 9-12, all relevant data structures have been allocated and initialized.

Before proceding with a description of the procedure of the invention, an example will be given of a simple COBOL program and of a preferred embodiment of the above mentioned relevant data structures used to describe the structure and characteristics of that program.

Referring to FIG. 1, COBOL program 10 includes a PERFORM statement at A, followed by STOP RUN, and a MOVE statement at B. This sequence of statements is divided into three basic blocks L 12, M 14, and N 16. Each of these basic blocks may be considered a node of a control flow graph, having edges X 22 and Y 24 connecting the nodes as will be further described in connection with FIG. 2.

Figure 2:
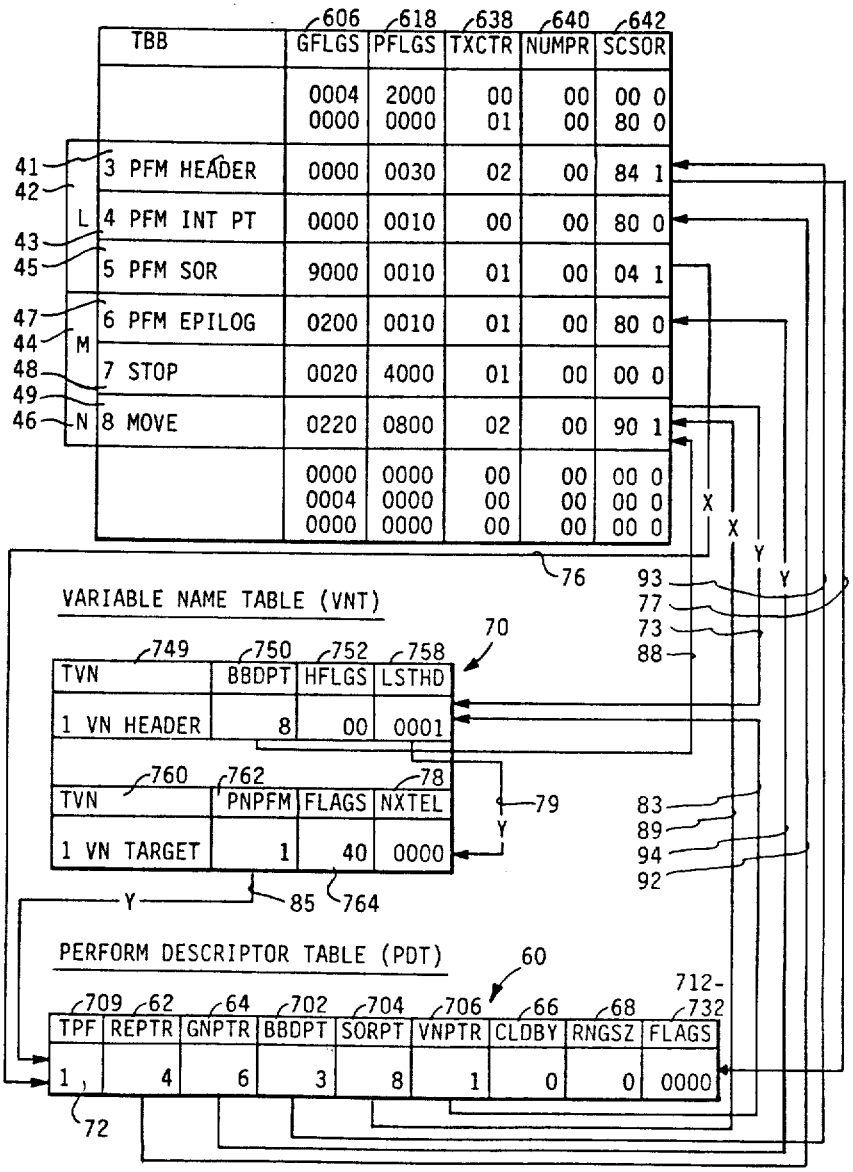
FIG. 2 is a diagrammatic illustration of the control block structure for doing PERFORM optimization.

Referring now to FIG. 2, in which all the field entries are shown in hexadecimal, basic blocks L, M, and N are illustrated at 42, 44, and 46, respectively, and are represented by entries 41, 43, 45, 47, 48, and 49 in Basic Block Descriptor (BBD) table 40, which includes the pointers or indexes from the BBD entries to the other data structures 70 and 60 illustrated.

A description will now be given of the Basic Block Descriptor (BBD) Table 40. This table includes a plurality of fixed-length entries 41, 43, 45, 47-49. Each node of the control flow graph for the program being compiled is represented by one or more BBD Table 40 entries. For example, basic block L 42 is described by entries 41, 43 and 45. The edges X and Y of the graph, which represent transfers of control from one node to another, are described by information in auxiliary tables 60 and 70, to be described hereafter. A BBD entry 41, . . . , 49 contains information about the basic block (node) This information, set forth in Table 13 in greater detail, includes (1) a plurality of flag bits TBBGFLGS 606 and TBBPFLGS 618 which are the repository for control flow information that the optimizer discovers during its analysis; (2) a text counter field TBBTXCTR 638 contains the number of instructions in the block, and is used during PERFORM optimization to decide whether a PERFORMed range is sufficiently small to be copied in line; (3) the number of predecessors TBBNUMPR 640 of (paths by which control can reach) the BBD; and (4) information TBBSCSOR 642 about any successors of (that is, BBDs which can be reached from) this BBD.

The Perform Descriptor Table (PDT) 60 is built by a control flow graph construction module for use by the PERFORM analysis procedure. There are as many fixed-length entries 72 as there are PERFORM statements, whether in the source program or generated by the compiler. A PERFORM descriptor table 60 entry 72 contains a variety of information about a given PERFORM statement and its environment, including (1) pointer TPFBBDPT 702 to the PERFORM header BBD 41, the BBD corresponding with the start of the PERFORM statement; (2) pointer TPFREPTR 62 to the PERFORM procedure integration point BBD 43, the BBD after which the PERFORMed procedure can be inserted if procedure integration optimization is to be done; (3) pointer TPFSORPT 704 to the start-of-range BBD 45 which describes the statement to which control is passed from the PERFORM statement; (4) pointer TPFVNPTR 706 to the end of range VN 75, the VN Header Table 70 entry for the PERFORM return 49 at the end of the PERFORMed procedure; and (5) pointer TPFGNPTR 64 to the PERFORM EPILOGUE 47. When a given PERFORM is called by other PERFORMs, TPFCLDBY 66 denotes a list of these calling PERFORMs (not shown in FIG. 2).

The flag bytes 712-732 and TPFRNGSZ (range size) 68 of PDT 60 are used to record the information discovered during PERFORM analysis and then acted on by PERFORM optimization. Table 14 sets forth the contents of the PERFORM Description Table.

The Variable Name (VN) Table 70 will next be described. The VN mechanism is used, among other things, for the return to a PERFORM statement at the end of its PERFORMed procedure. A VN is illustrated at line 18 of Table 1. VNs are allocated in the dynamic storage for a COBOL program, for example. PERFORM statements set the VN values (see Table 1, lines 2 and 3), which are then acted on by PERFORM returns, as is illustrated in Table 1 lines 13 and 14. Thus, the VN tables are used as an edge representation in the control flow graph. VN Table 70 has as many entries 75 as there are VNs (in this example, one), and points (88) to the BBD 49 that terminates with a PERFORM return. Entries for a given VN are distributed through the table, connected by the link fields 76, 78. The link field 78 of the last entry in the list is zero. Table 15 sets forth the format of the VN Table.

Referring further to FIG. 2 in connection with FIG. 1, a description will be given of the two edges X and Y. Edge X is implemented as follows. BBD entry PERFORM SOR 45 includes a pointer 76 to PD Table entry 72, which in turn includes a pointer TPFSORPT 704 represented by line 89 to start of range BBD Table 40 entry 49, labeled MOVE. Edge Y is implemented as follows. BBD Table 40 entry 49 (MOVE), in this example, is the end of range as well as the start of range of the PERFORM, and includes a pointer TBBSCSOR 642, represented by line 73, to VNT 70 entry VN HEADER 75. VN HEADER 75 includes a pointer TVNLSTHD 758, represented by line 79, to a corresponding VN TARGET entry, which in turn includes a pointer TVNPNPFM 762, represented by line 85, to PDT 60 entry 72. This PDT 60 entry 72 finally includes a pointer TPFGNPTR 64, represented by line 94, to the PERFORM EPILOG (BBD Table 40 entry 47). This completes the representation of edge Y. All other lines, 77, 83, 88, 92, 93, do not denote control flow but are provided for relating the information in the data structures represented by tables 40, 60, and 70.

Figure 3:
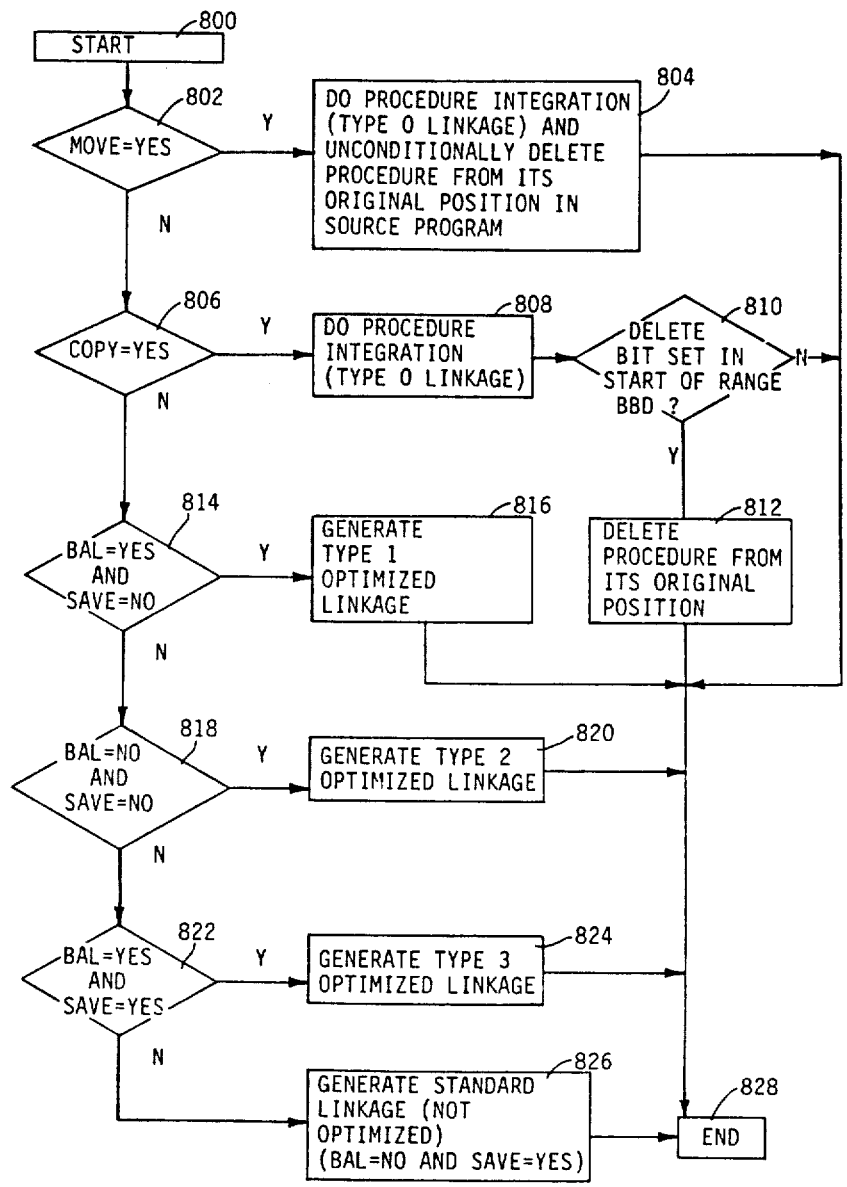
FIG. 3 illustrates PERFORM statement transformation.
Figure 4:
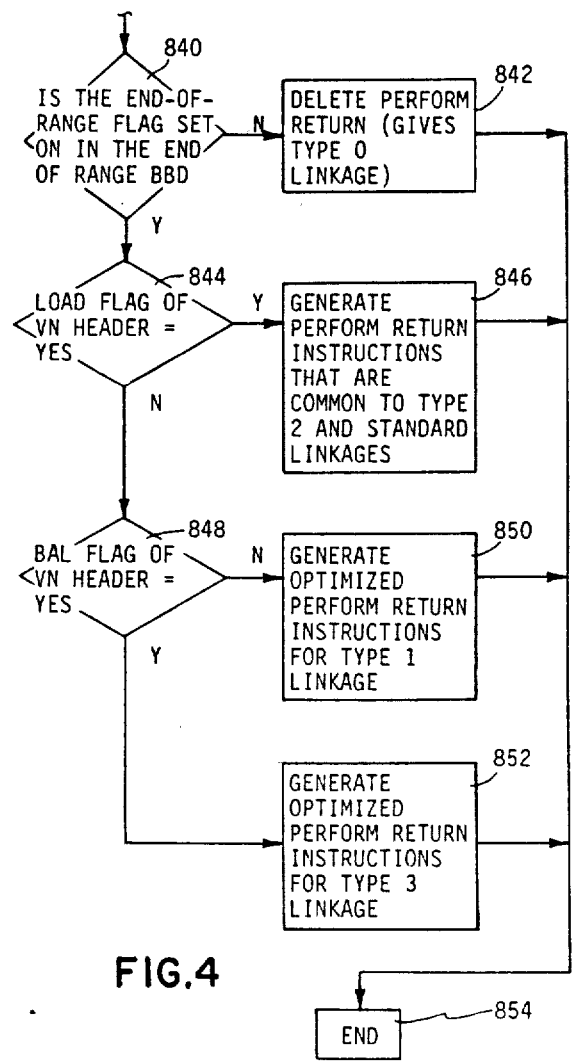
FIG. 4 illustrates PERFORM return transformation.

Referring to FIG. 3, a description will be given of PERFORM statement transformation for a given PERFORM statement having the MOVE, COPY, BAL, and SAVE characterization in its PDT 60 entry. In steps 802 and 804, responsive to MOVE being yes, the PERFORM statement is completely replaced by its PER- FORMed procedure (procedure integration), and the PERFORMed procedure is deleted from its original position in the source program. In steps 806 and 808, responsive to COPY being yes, procedure integration is performed. In steps 810, 812, if the delete flag is set to yes in the start-of-range BBD (for example, BBD 49 in FIG. 2), then the PERFORMed procedure is deleted from its original position in the source program. In steps 814 and 816, responsive to BAL being yes and SAVE being no, type 1 optimized linkage is generated, similar to that illustrated in Table 3. In steps 818 and 820, responsive to BAL being no and SAVE being no, type 2 optimized linkage is generated, similar to that illustrated in Table 4. In steps 822 and 824, responsive to BAL bing yes and SAVE being yes, type 3 optimized linkage is generated, similar to that illustrated in Table 5. In step 826, where BAL is no and SAVE is yes, the standard, or not optimized, linkage is generated, similar to that illustrated in Table 6.

Referring now to FIG. 4, a description of PERFORM return transformation will be given. This phase responds to the end-of-range flag TBBPFEOR in the BBD table 40 entry for the PERFORM return to be transformed (such as statement 49 in FIG. 2), and to the LOAD flag TVNHFLOD and BALR flag TVNHFBAL characterization found in the VN Table 70 TVNHFLGS field for VN header entry (such as statement 75 in FIG. 2). In step 840 the end-of-range flag bit is tested. Only if it is on is this PERFORM return truly an end-of-range. If it is not, in step 842 a PERFORM return is not generated. In this embodiment, this is accomplished by deleting the PERFORM return that the compiler had previously inserted at the end-of-range. If this PERFORM return is truly and end-of-range, then in steps 844 and 846, responsive to LOAD being yes, PERFORM return instructions common to type 2 and standard linkages are generated, similar to that illustrated in Tables 4 and 6 (L and BR). In steps 848 and 850, responsive to BALR being no (and LOAD being no, step 844), optimized PERFORM return instructions for type 1 linkage are generated, similar to that illustrated in Table 3. Otherwise (LOAD being no, BALR being yes), in step 852 optimized PERFORM return instructions for type 3 linkage are generated, similar to that illustrated in Table 5.

Figures 12, 13:
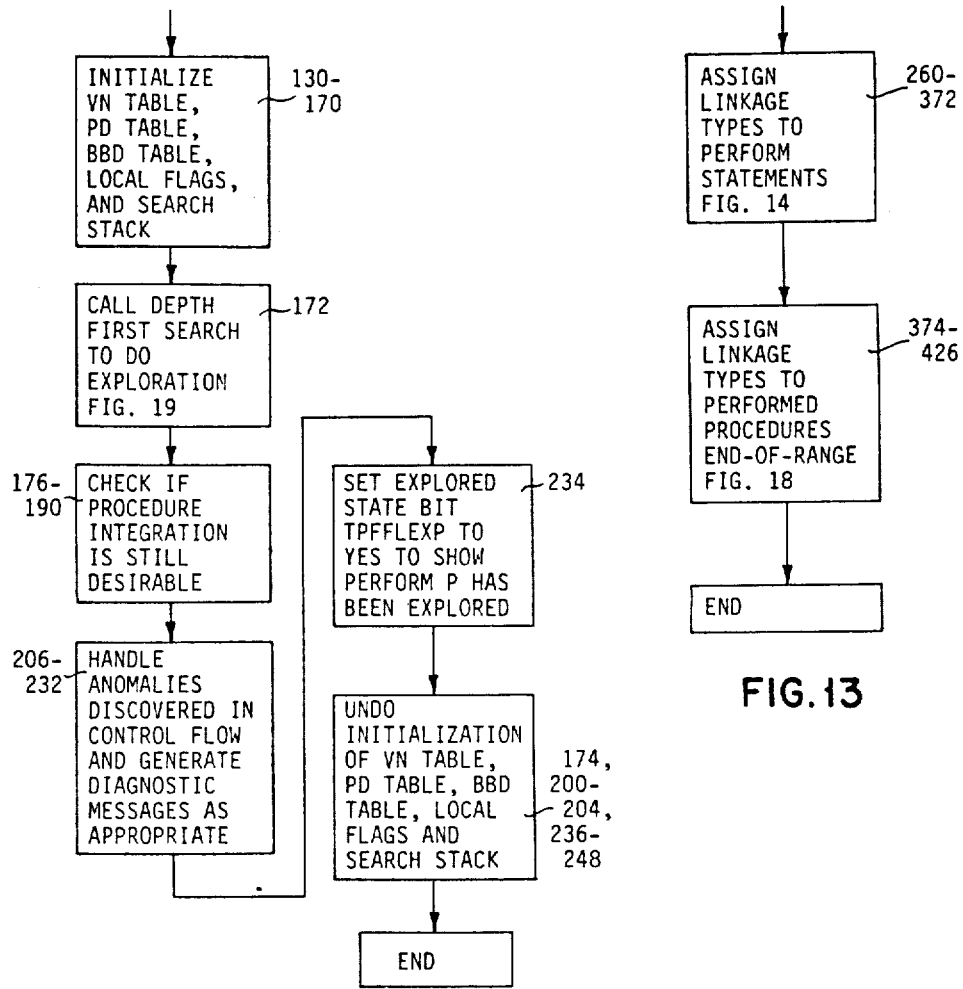
FIG. 12 describes the PERFORM exploration procedure.
FIG. 13 provides a high-level description of PERFORM linkage assignment.
Figure 14:
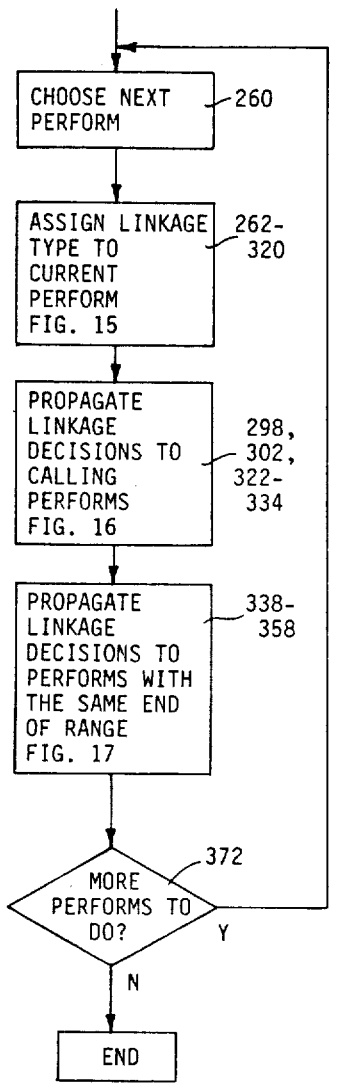
FIG. 14 provides a high-level description of PERFORM statement linkage assignment.
Figure 16:
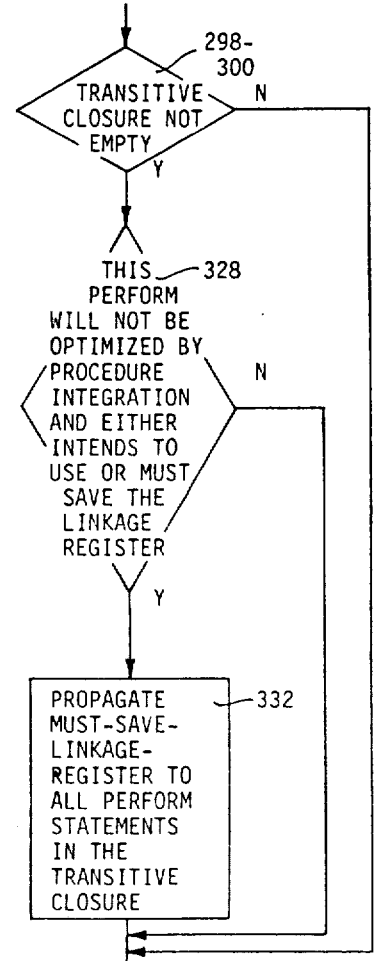
FIGS. 16 and 17 describe the PERFORM statement linkage propagation procedures.
Figure 15:
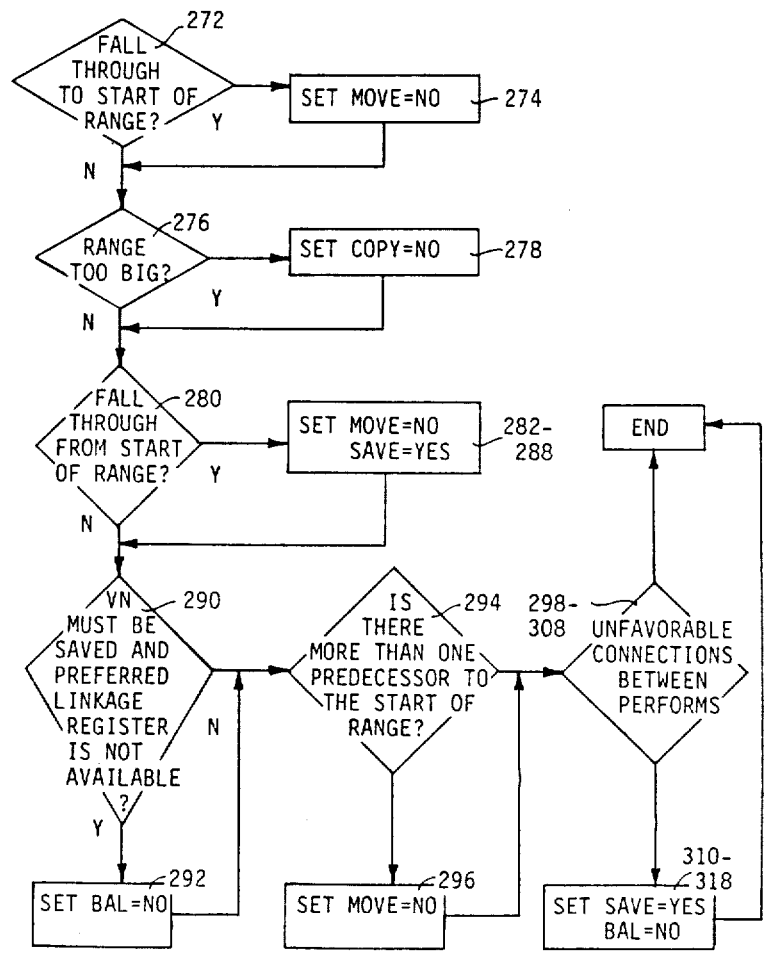
FIG. 15 describes the PERFORM statement linkage determination procedure.
Figure 17:
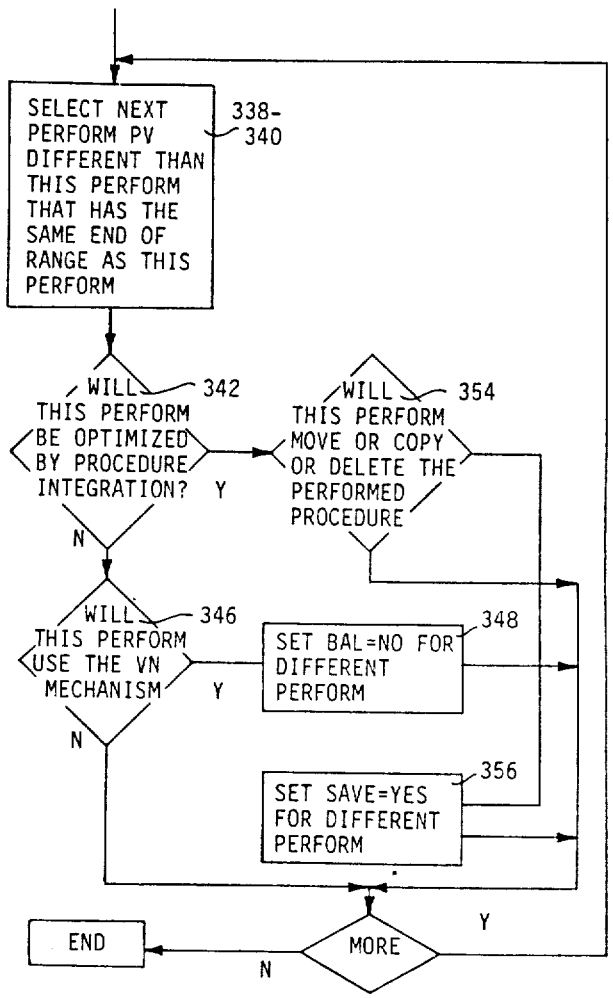
Figure 18:
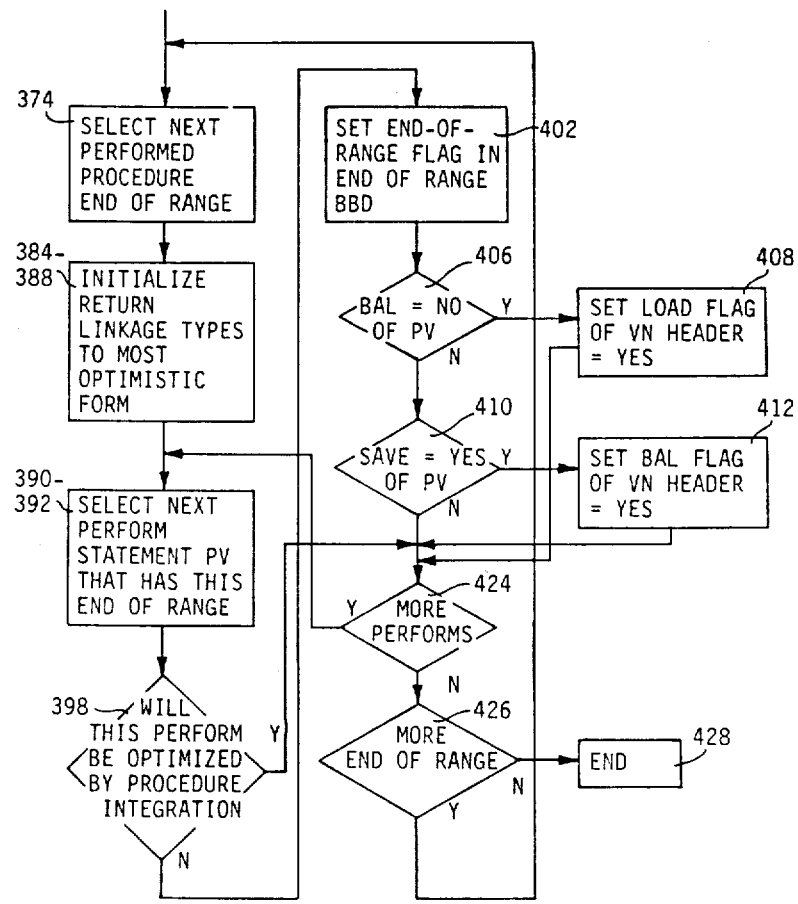
FIG. 18 describes the PERFORM linkage return assignment procedure.
Figure 19:
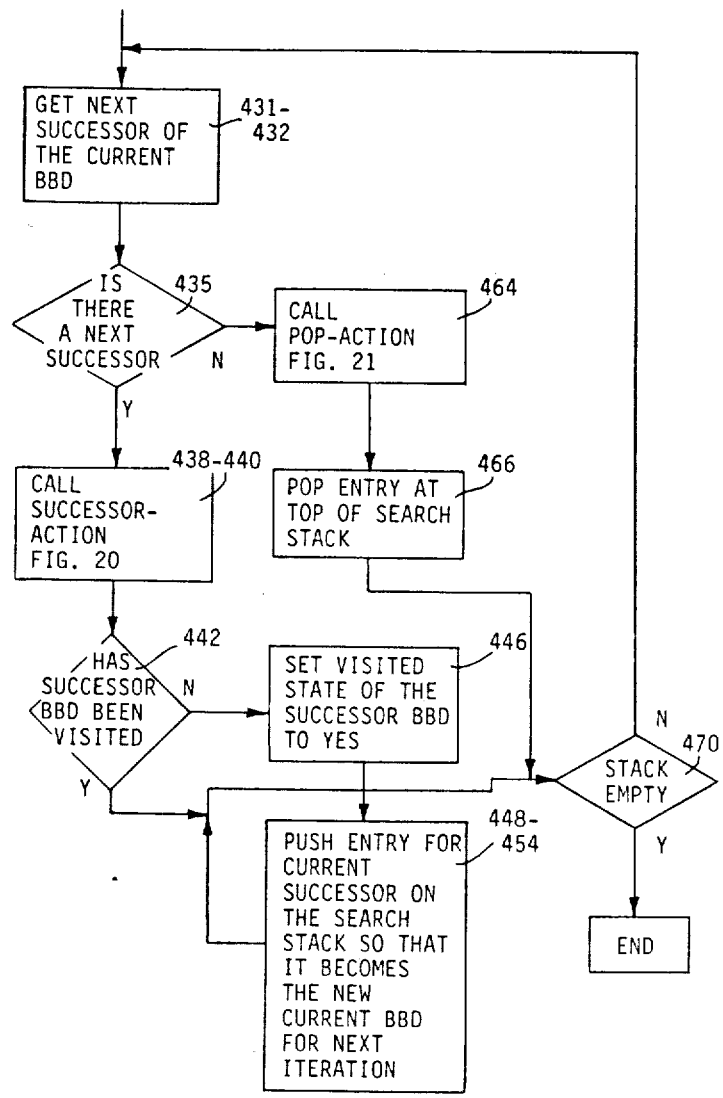
FIG. 19 describes the depth-first search procedure.
Figure 20:
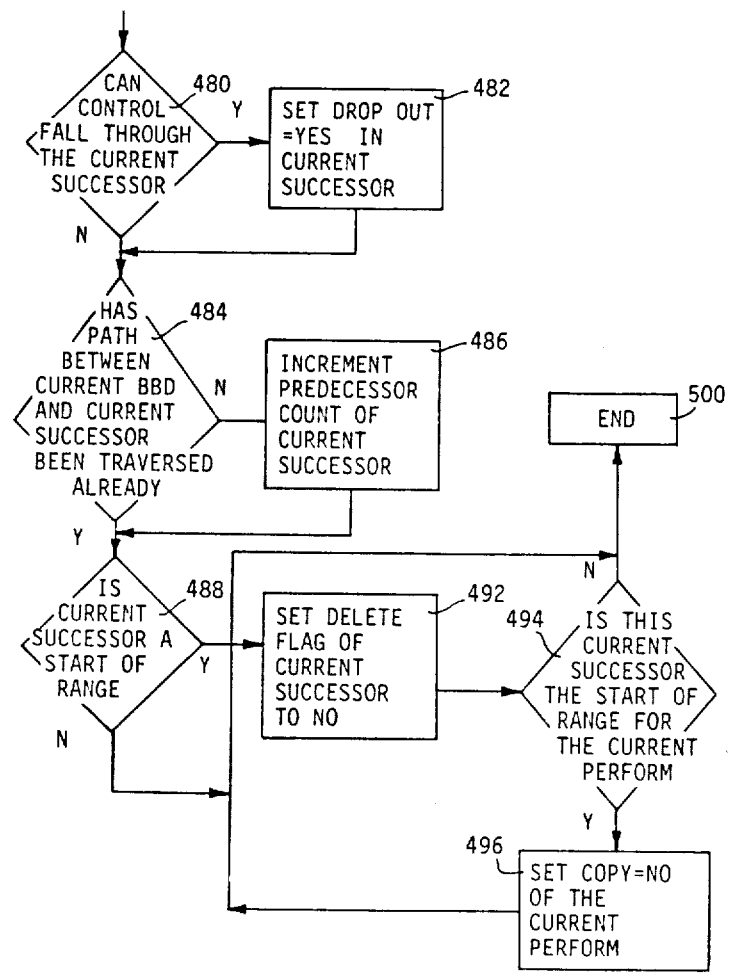
FIG. 20 describes the successor-action procedure.
Figure 21A:
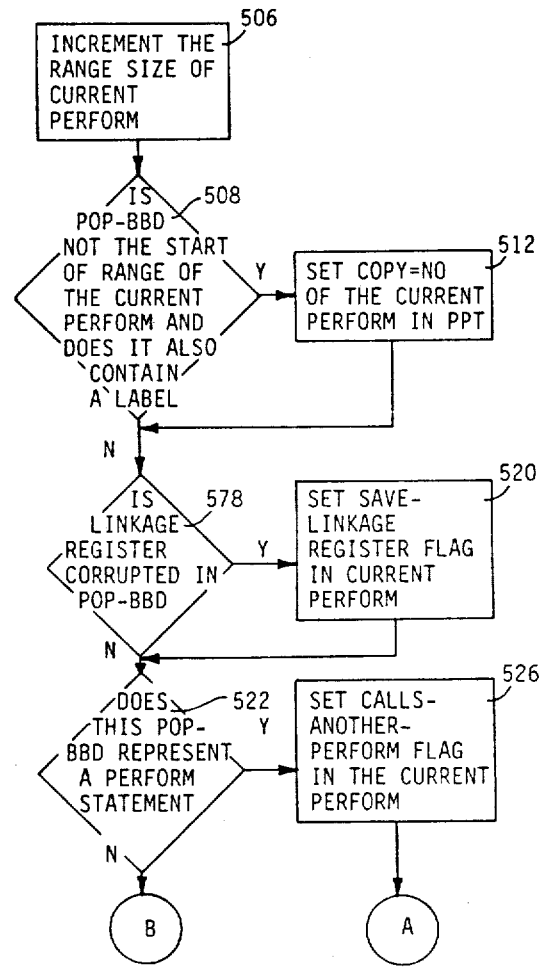
FIGS. 21A–21C describe the POP-action procedure.
Figure 21B:
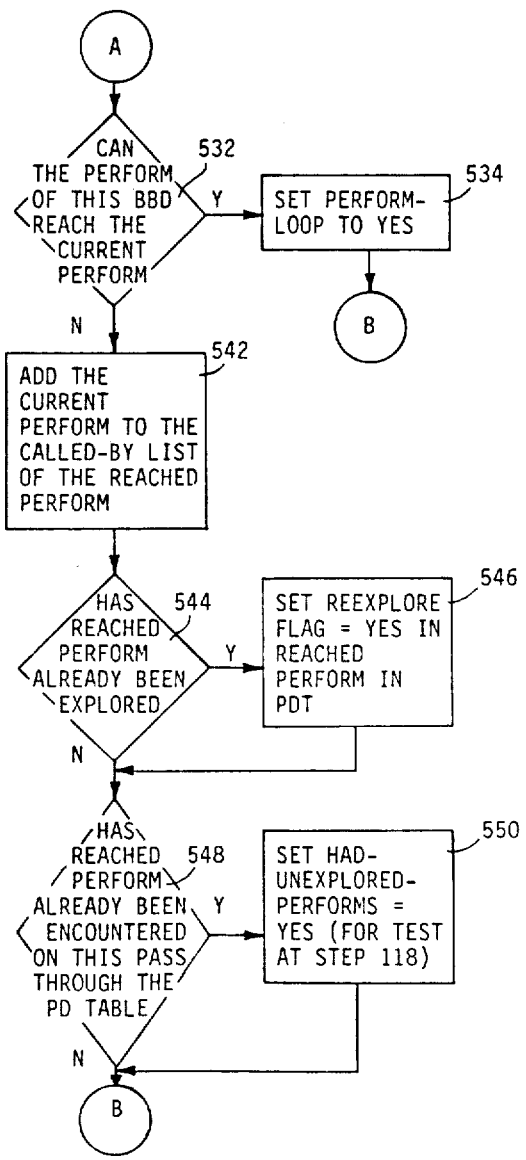
Figure 21C:
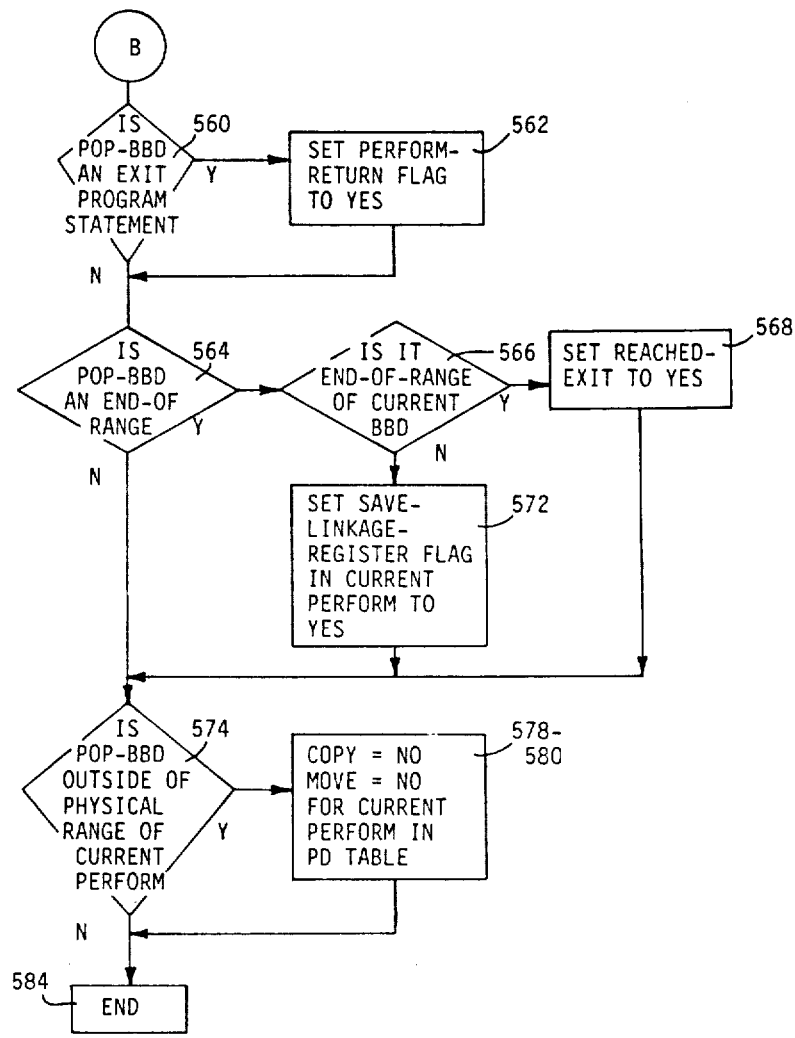

PERFORM analysis (Table 9) determines the environment of each PERFORM statement and PERFORMed procedure in the source program, and comprises the steps of (1) PERFORM exploration (FIG. 9, lines 102-254) and (2) PERFORM linkage assignment (FIG. 13, lines 260-246).

Initially, every PERFORM statement in the program is characterized by optimistic settings of the Boolean quantities: MOVE is YES, and COPY is YES, and BAL is YES, and SAVE is NO. This characterization implies that each PERFORM can be optimized by procedure integration, which is the most effective transformation. As PERFORM analysis is executed against the program, and discovers circumstances that are in conflict with this characterization, it changes these optimistic initial settings of the Boolean quantities, which may deteriorate toward: MOVE is NO, and COPY is NO, and BAL is NO, and SAVE is YES. These latter settings characterize the standard linkage mechanism. Because initialization of the data structures is done by setting them to binary zeros, which in the case of flags is interpreted as NO, the MOVE, COPY, and BAL characterizations are implemented in the preferred embodiment by negative logic. For example, the optimistic setting MOVE is YES becomes NO-MOVE is NO (TPFFLNMV 726) in the preferred embodiment described in Tables 9-15.

A description will now be given of PERFORM exploration.

For each reachable PERFORM statement in the program being compiled, referred to as the current PERFORM, a depth-first search of the control flow graph is pursued from the first basic block in the PERFORMed procedure. This first block of the procedure is referred to as the "start of range". The last basic block in the PERFORMed procedure is known as the "end of range", and is regarded as having no successors.

Figure 5:
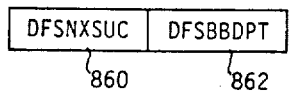
FIG. 5 illustrates one entry of a depth-first search stack.

As is described in Table 10, depth-first search is a strategy for exploring a graph, whereby, so long as there are unexplored successors of a node, the frontier of the search is extended to these successors. A node is visited only when all of its successors have already been visited. Implementation of the search uses the stack described in FIG. 5, including fields DFSNXSUC 860 and DFSBBDPT 862. Field 860 is a pointer to a BBD from which the search is to be pursued, and field 862 is an indicator of which of this BBD's successors should be explored next. The search begins at step 170 by pushing onto the search stack (FIG. 5) an entry for the start-of-range BBD. The search progresses at line 431 by selecting the BBD 40 denoted by the topmost stack entry. If the BBD still has an unvisited successor, CSUCCPTR is non-null at line 432, and an entry for this successor is pushed onto the stack to become the new topmost entry. For each successor, whether visited or not, the Successor-action procedure of Table 11 is called. If all of the successors of the BBD have already been visited, then the BBD is itself visited, by calling the POP-action procedure of Table 12. After the BBD has been visited, its entry is popped from the stack. The search continues in this way until the stack is empty.

During the exploration for a given PERFORM STATEMENT, the flow of control from any PERFORM statements that are incountered is ignored. These encountered PERFORM statements are referred to as reached, or called, PERFORMs. For example, referring to FIG. 7, the physical range 888 of current PERFORM 880, is defined by the contiguous sequence of statement beginning with start of range SOR 882 and ending with end of range EOR 886. While the true successor of reached PERFORM statement 884 is *its* start of range, exploration for current PERFORM 880 assumes that the successor is the epilogue of PERFORM 884, thus effectively assuming the successful execution of the PERFORMed procedure of the reached PERFORM 884. This assumption is implemented by procedure step 432.

Figure 7:
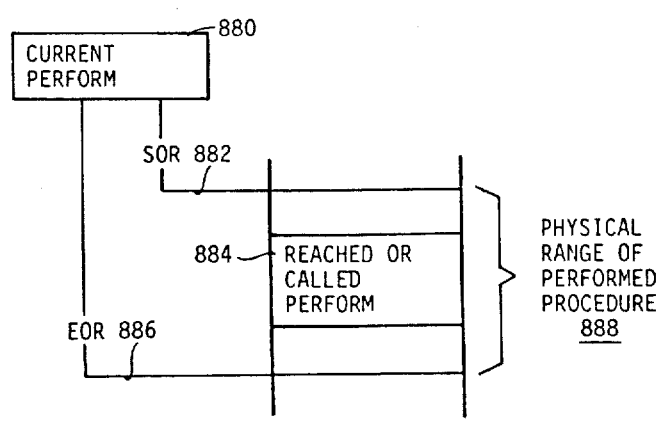
FIG. 7 illustrates a PERFORM statement and its range.

The linear sequence of statements from the first in the PERFORMed procedure to the last is referred to as the "physical range" of the PERFORM statement, as is illustrated by FIG. 7. The actual range of a PERFORMed procedure may include statements outside the physical range, since control can validly pass outside the limits of the physical range.

If control can pass to the current PERFORM statement from another PERFORM statement without first passing to the epilogue of the other PERFORM, the current PERFORM statement is said to be "called" by the other PERFORM.

The end of range basic block for a PERFORM statement Q that cannot call the current PERFORM is regarded as having only a single successor (the fall-through successor): the basic block that immediately follows Q's end of range basic block.

The end of range basic block for a PERFORM statement R that can call the current PERFORM is regarded as having two successors: (1) the basic block that immediately follows R's end of range basic block, and (2) the basic block representing R's epilogue, to which control passes after the last statement in R's PERFORMed procedure has been executed.

If, during the exploration of steps 128-250 for the current PERFORM statement, another PERFORM statement is encountered at step 522, the exploration does not immediately follow the flow of control from this called PERFORM. Instead, at steps 538-552 the linkage between the two PERFORM statements is recorded, and the other PERFORM is marked to be explored, or to be explored again if it has already been explored. A PERFORM may be explored again because it may reach more than before due to the extra successor of the calling PERFORM statement's end of range.

As PERFORM exploration progresses, the following events are recorded.

First, at steps 480-482 if control can fall through a basic block, this is noted in the basic block descriptor field TBBPFDOU.

Second, at steps 484-486 if the path by which the basic block was reached is being traversed for the first time, the "predecessor count" field TBBNUMPR in the block descriptor is incremented.

Third, at steps 488-496 if the basic block represents the start of range of a PERFORM statement, then the basic block descriptor is marked so that the range will not be deleted from its original position. If the block is the start of range for the current PERFORM, then the current PERFORM descriptor is marked COPY is NO.

Fourth, at step 506 the number of instructions in the basic block is added to the range size field TPFRNGSZ in the current PERFORM descriptor.

Fifth, at steps 508-512 if the basic block contains a label and is not the start of range of the current PERFORM, then the current PERFORM descriptor is marked COPY is NO in field TPFFLNCP, because the program cannot contain duplicate labels.

Sixth, at steps 514-516, if the counter register (used in format 2 PERFORMs) is modified in the basic block, then the current PERFORM descriptor is marked in field TPFFLSVC to show that the contents of the counter register cannot be relied on across execution of the PERFORMed procedure.

Seventh, at steps 518-520, if the linkage register RL is modified in the basic block, then the current PERFORM descriptor is marked in field TPFFLSVL to show that the contents of the linkage register cannot be relied on across execution of the PERFORMed procedure.

Eighth, at steps 522, 532-534, if the basic block represents the current PERFORM STATEMENT, then there is a potential loop in PERFORM control flow. The subsequent process of PERFORM linkage assignment of steps 260-426 requires that the flow graph representing the calling relation between PERFORM statements be cycle free, so at step 218 an error message is given. Although PERFORM exploration of steps 128-250 continues, PERFORM linkage assignment is not done.

Ninth, at steps 522, 536, if the basic block represents a PERFORM statement other than the current PERFORM, then at steps 538-552 the link between the two PERFORM statements is added to the PERFORM called-by list, described hereafter, of the other PERFORM descriptor. The other PERFORM is marked to be explored, or to be explored again if it has already been explored.

Tenth, at steps 560-562, if the basic block represents an EXIT PROGRAM or GO BACK statement, then there is a potential loop in PERFORM control flow, so at step 230 an error message is given. Although PERFORM exploration continues, PERFORM linkage assignment is not done.

Eleventh, at steps 564-566, if the basic block is the end of range of the current PERFORM, then at step 568 a flag reached-exit is set to yes to show that the current PERFORM can reach its exit. This reached-exit flag is tested at step 206, an error message is given at step 208 if reached-exit is no.

Twelfth, if the basic block is the end of range of another PERFORM statement, then the current PERFORM descriptor is marked to show that the contents of the linkage register cannot be relied on across execution of the PERFORMed procedure. This is done in case the linkage mechanism adopted by the other PERFORM statement involves the linkage register.

Finally, if the basic block lies outside the physical range of the PERFORMed procedure, in steps 578-580 the current PERFORM descriptor is marked MOVE is NO in field TPFFLNMV and COPY is NO in field TPFFLNCP.

At the end of the exploration for the current PERFORM statement, in steps 176-190 each basic block in the physical range of the PERFORMed procedure is examined. If any of these basic blocks contains a label, but was not visited during the search, in steps 184-186 the current PERFORM descriptor is marked MOVE is NO in field TPFFLNMV and COPY is NO in field TPFFLNCP. This is done because failure to visit every block of a PERFORMed procedure is evidence of complicated control flow. Such cases are not considered worth the effort of optimizing by procedure integration.

A description will now be given of PERFORM linkage assignment, set forth in steps 260-426 consisting of PERFORM statement linkage assignment at step 260-372, followed by PERFORM return linkage assignment at steps 374-426.

PERFORM statement linkage assignment starts at steps 260-320 by determining the linkage for the current PERFORM statement. Then during linkage propagation steps 322-358 each PERFORM statement that can call the current PERFORM statement, directly or indirectly, is informed of the linkage decisions that were made for the current PERFORM, so that its own linkage decisions can be made properly.

A breadth-first search is a strategy for exploring a graph familiar to those skilled in the art of computer science, and is described by Narsingh Deo, "Graph Theory with Applications to Engineering and Computer Science", Prentice-Hall, N.J., 1974, at pages 301-302. PERFORM statements are processed in breadth-first order with respect to the called-by graph determined at steps 538-552 during the preceding PERFORM exploration. The called-by graph is a directed, acyclic graph such that if a PERFORM statement can be called directly by another PERFORM statement, there is an edge in the called-by graph going from the node representing the called PERFORM statement to the node representing the calling PERFORM statement. A given node has a successor if its corresponding PERFORM statement can be called by another PERFORM. The graph is guaranteed to be cycle free. If at step 532 PERFORM exploration detects a cycle, PERFORM linkage assignment does not process the graph.

The first PERFORM statements to be assigned linkages are those that cannot call any other PERFORM statements. By the cycle-free property, there is guaranteed to be at least one. These PERFORM statements may be called by other PERFORM statements. If so, at steps 260-320 any decisions about the linkages of the called PERFORM statements are made before assigning the linkage of the calling PERFORM statements. This is because the linkage of the calling PERFORM statements may be affected by the linkage characteristics of any PERFORM statements that can be called. The breadth-first ordering on the called-by graph ensures this property.

During PERFORM STATEMENT linkage determination at steps 260-320, the context of the current PERFORM, discovered by the preceding PERFORM exploration, is examined to determine the appropriate linkage mechanism, as follows:

First, at steps 272-274 if control can fall through to the start of range from the basic block preceding it, or if the start of range is the first basic block in the program, the current PERFORM descriptor is marked MOVE is NO. In general, if control can fall into or fall out of a procedure, then a copy of the procedure must remain at its original location. In effect, the procedure may be locked at either end in this way.

Second, at steps 276-278 if the number of instructions in the current PERFORMed procedure is larger than an implementation-defined limit, then the current PERFORM descriptor is marked COPY is NO.

Third, at steps 280-288 if control can fall through the end of range basic block of the current PERFORM, then the current PERFORM descriptor is marked MOVE is NO and SAVE is YES.

Fourth, at steps 290-292, if the current PERFORM descriptor is marked SAVE is NO but the linkage register must be saved, then the current PERFORM descriptor is marked BAL is NO. Type 0 optimized linkage cannot be used because it depends on the linkage register. Type 2 optimized linkage (BAL is NO, and SAVE is NO) has one fewer instructions than type 3 optimized linkage (BAL is YES, and SAVE is NO).

Fifth, at steps 294-296, if the basic block representing the current start of range has more than one predecessor, the current PERFORM descriptor is marked MOVE is NO.

Finally, at steps 298-300, if any PERFORM that can call the current PERFORM, directly of indirectly, has the same end of range as the current PERFORM, and if the current PERFORM descriptor is marked MOVE is NO and COPY is NO and either SAVE is NO or BAL is YES (that is if procedure integration would not be done and the linkage would be anything other than the standard linkage), then the current PERFORM descriptor is marked SAVE is YES in field TPFFLSVV and BAL is NO in field TPFFLNBL. This means that nested PERFORM procedures with the same end of range executed by PERFORM statements, one of which calls the other, do not get the most efficient linkage, but are forced to use the VN mechanism instead.

Figure 6:
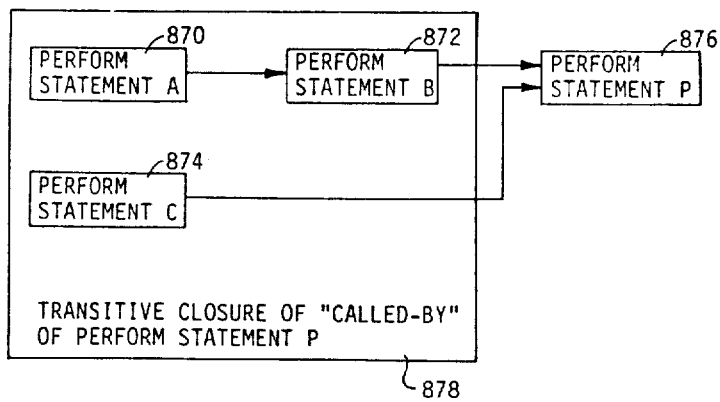
FIG. 6 illustrates the transitive closure of a calling PERFORMs.

During linkage propagation of steps 298-300, 328-332, the first propagation is for every PERFORM statement in the transitive closure of the called-by relation of the current PERFORM statement. Referring to FIG. 6, the transitive closure 878 of the called-by relation of PERFORM statement 876 includes PERFORM statements 870, 872, and 874: every PERFORM that can call the current PERFORM, directly (872 and 874) or indirectly (870). The calling PERFORM descriptor is marked in field TPFFLAGS to show that the PERFORM linkage register should be saved if the current PERFORM descriptor is marked to show (1) that the PERFORM linkage register should be saved, or (2) that the BAL form of linkage, which involves the linkage register, can be used (MOVE is NO and COPY is NO and BAL is YES).

At steps 338-358, the final propagation is done for every PERFORM statement that has the same end of range as the current PERFORM statement, regardless of whether or not it can call the current PERFORM statement. If the current PERFORM has been assigned one of the forms of linkage that use the VN mechanism (MOVE is NO and COPY is NO and either SAVE is YES or BAL is NO), then at step 348 the descriptors of fields TPFFLNBL for every other PERFORM statement with the same VN are marked BAL is NO, to make sure that they also use one of the VN-based linkages. If the current PERFORM is to be optimized by procedure integration, and the PERFORMed procedure is to be deleted from its original position, then in step 356 the descriptors for every other PERFORM statement with the same VN are marked in field TPFFLSVV SAVE is YES. The value of the VN must be saved by these other PERFORM statements since control can now fall through the end of range of their PERFORM procedures due to the procedure integration.

PERFORM return linkage assignment will now be described. All end-of-range BBDs (such as BBD Table 40 entry 47 of FIG. 2) are initialized with TBBPFEOR 626 (of Table 13) set to NO. This implies that no PERFORM instructins will be generated, on the assumption that procedure integration will be done. All VN Header Table entries, for instance entry 75 in FIG. 2, are initialized to LOAD is NO (TVNHFLOD 754 of Table 15) and BALR is NO (TVNFLBAL 756 of Table 15). These setting simply that if any PERFORM return instructions will be generated (TBBPFEOR of the end-of-range BBD is YES), then the most optimal form of PERFORM return, as used in type 1 linkage Table 3, will be generated.

As PERFORM return linkage assignment progresses, these initial optimistic settings may deteriorate toward TBBPFEOR is YES, LOAD is YES, and BALR is YES. These settings cause the standard linkage return mechanism, also used in type 2 linkage Table 4, to be generated.

During PERFORM return linkage assignment steps 374-426, for each unique PERFORM end of range, the context of every PERFORM statement that has this end-of-range is examined to determine the appropriate PERFORM return linkage mechanism.

At step 398, if all of these PERFORMs will be optimized by procedure integration (MOVE is YES or COPY is YES), then no PERFORM return instructions are generated. Otherwise, if any of these PERFORMs will not be optimized by procedure integration (MOVE is NO and COPY is NO), the TBBPFEOR flag is set at step 388, causing some PERFORM return instruction to be generated. The type of PERFORM return linkage generated depends on the SAVE and BAL characterization of the PEFORM statement as follows.

If at steps 406-408, any of these PEFORMs cannot use the BAL linkage mechanism (BAL is NO), then the current VN Header Table entry is marked LOAD is YES (TVNHFLOD 754 of Table 15), thereby forcing use of the VN mechanism for the PERFORM return. This kind of PERFORM return is used in type 2 and standard linkage, Tables 4 and 6, respectively. Otherwise, if at steps 410-412, any of these PERFORMs must save the VN value (SAVE is YES), then the current VN Header Table entry is marked BALR is YES (TVNHFBAL 756 of Table 15), which means that the style of PERFORM return used in type 3 linkage Table 5 will be generated. Otherwise, LOAD and BALR remain NO, which causes generation of the optimized PERFORM return, as used in type 1 linkage Table 3.

In Table 7 is set forth an example program in COBOL for demonstrating all of the optimized forms of PERFORM linkage, and in Table 8 is set forth the code generated in System/370 assembly language therefrom by PERFORM optimization.

The procedure of the invention is set forth in pseudo-code representation in Tables 9-12. As will be apparent to those skilled in the art, the structured psuedo-code representation of the procedure set forth in Tables 9-12 may be coded without undue experimentation into a source language of the programmer's choice, such as Pascal or PL/I, for compilation and execution on a computing system, such as the IBM System/370. While a structured psuedo-code representation clearly sets forth the procedure of the invention to those skilled in the art, to provide a complete source code or object code listing would tend to hide the invention in a prolixity of unnecessary, language-dependent, detail. Throughout these tables, explanatory comments are enclosed in brackets [comment].

TABLE 7
A SAMPLE COBOL PROGRAM

| 16 | I. | PERFORM A THRU C. |
| 17 |    | PERFORM B THRU D. |
| 18 |    | PERFORM E THRU F. |
| 19 |    | PERFORM E THRU F. |
| 20 |    | PERFORM G THRU H. |
| 21 |    | STOP RUN. |
| 22 | A. | ADD X1 TO Y. |
| 23 | B. | ADD X2 TO Y. |
| 24 | C. | ADD X3 TO Y. |
| 25 | D. | ADD X4 TO Y. |
| 26 | E. | ADD X5 TO Y. |
| 27 | F. | ADD X6 TO Y. |
| 28 | G. | ADD X7 TO Y. |
| 29 | H. | ADD X8 TO Y. |

TABLE 8
GENERATED CODE DEMONSTRATING PERFORM OPTIMIZATION

| 16 | PERFORM | | |
| *** | OPT *** | PERFORM linkage simplified (to type 3) | |
|    | I       | LA | 2,GN=1 |
|    |         | ST | 2,VN=1 |
|    |         | B  | A |
|    | GN=1    | EQU | * |
|    |         | ST | 15,VN=1 |
| 17 | PERFORM | | |
| *** | OPT *** | PERFORM linkage simplified (to type 2) | |
|    |         | LA | 2,GN=2 |
|    |         | ST | 2,VN=2 |

TABLE 8-continued
GENERATED CODE DEMONSTRATING PERFORM OPTIMIZATION

|    |         | B  | B |
|    | GN=2    | EQU | * |
| 18 | PERFORM | | |
| *** | OPT *** | PERFORM linkage simplified (to type 1) | |
|    |         | BAL | 15,E |
| 19 | PERFORM | | |
| *** | OPT *** | PERFORM linkage simplified (to type 1) | |
|    |         | BAL | 15,E |
| 20 | PERFORM | | |
| *** | OPT *** | PERFORM linkage simplified (to type 0) | |
| *** | OPT *** | PERFORM procedure integration started | |
| 28 | ADD | | |
|    | G   | AP | Y,X7 |
| 29 | ADD | | |
|    | H   | AP | Y,X8 |
| *** | OPT *** | PERFORM procedure integration ended | |
| 21 | STOP | ... | |
| 22 | ADD | | |
|    | A   | AP | Y,X1 |
| 23 | ADD | | |
|    | B   | AP | Y,X2 |
| 24 | ADD | | |
|    | C   | AP | Y,X3 |
| *** | OPT *** | PERFORM linkage simplified | |
|    |         | L  | 2,VN=1 |
|    |         | BALR | 15,2 |
| 25 | ADD | | |
|    | D   | AP | Y,X4 |
|    |     | L  | 2,VN=2 |
|    |     | BR | 2 |
| 26 | ADD | | |
|    | E   | AP | Y,X5 |
| 27 | ADD | | |
|    | F   | AP | Y,X6 |
|    |     | BR | 15 |

TABLE 9A
PERFORM-ANALYSIS

PERFORM-analysis: PROCEDURE;
100    IF there are no PERFORM statements in the program THEN RETURN;
PERFORM-Exploration [to line 254]
102    DO for each Basic Block Descriptor (BBD) B in the program flow graph;
103    SET TBBGFVIS of BBD B to 'no';
104    END;
106    DO for each entry P in the PERFORM Descriptor Table;
108    Let SOR-BBD be the BBD pointed to by ATRXRPTR of the Attribute Table entry pointed to by TPFSORPT of PERFORM Descriptor TABLE entry P;
110    SET TBBPFSOR of SOR-BBD to 'yes';
112    IF TBBGFRCH of SOR-BBD is 'no' [a previous phase of the compiler will have set TBBGFRCH to 'yes' if the SOR-BBD was reached during a prior search] THEN
114    SET TBBPFDEL of SOR-BBD to 'yes' [to show the initial assumption that the PERFORM range can be deleted if it is copied in-line in place of PERFORM statements];
116    END; [DO for each entry P, line 106]
118    DO UNTIL had-unexplored-PERFORMs is 'no' [This DO statement will end at line 254];
120    SET had-unexplored-PERFORMs to 'no';
122    DO for each entry P (current PERFORM) in the PERFORM Descriptor TABLE [this DO statement will end at line 252];
124    Let PFM-BBD be the BBD pointed to by TPFBBDPT of PERFORM Descriptor Table entry P;
126    IF TBBGFRCH of BBD PFM-BBD is 'yes' [control can reach this PERFORM] AND (TPFFLEXP of PERFORM Descriptor Table entry P is 'no' [the PERFORM has not yet been explored] OR TPFFLREX of PERFORM Descriptor Table entry P is 'yes' [the

TABLE 9A-continued
PERFORM-ANALYSIS

| | |
|---|---|
| | PERFORM must be re-explored]) THEN |
| 128 | DO; [this DO statement will end at line 250] |
| 130 | Let closure be the set of PERFORM Descriptor Table entries in the transitive closure of TPFCLDBY of PERFORM Descriptor Table entry P; |
| 132 | SET TPFFLVIS of PERFORM Descriptor Table entry P to 'yes'; |
| 134 | DO for each PERFORM Descriptor Table entry PC in closure; |
| 136 | Let VN-list-PC be the list of VN Table entries whose head is pointed to be TPFVNPTR of PERFORM Descriptor Table entry PC; |
| 138 | Let VN-PC be the VN Table entry in VN Table entry list VN-list-PC that points back to PERFORM Table entry PC; |
| 140 | SET TVNFLACT of VN Table entry VN-PC to 'yes' [to show that the corresponding PERFORM return is active]; |
| 142 | SET TPFFLVIS of PERFORM Descriptor Table entry PC to 'yes'; |
| 144 | END; |
| 145.1 | Let VN-list-P be the list of VN TABLE entries whose head is pointed to be TPFVNPTR of PERFORM Descriptor Table entry P; |
| 145.2 | Let VN-P be the VN Table entry in VN Table entry list VN-list-P that points back to PERFORM Table entry P; |
| 145.3 | SET TVNFLACT of VN Table entry VN-P to 'no' [to show that the end of range for the current PERFORM has no successors]; |
| 146 | Let SOR-BBD be the BBD [the start-of-range basic block] pointed to by TPFSORPT of PERFORM Descriptor Table entry P; |
| 148 | Let VN-list-header be the VN Table entry pointed to by TPFVNPTR of PERFORM Descriptor Table entry P; |
| 150 | Let EOR-BBD be the BBD [the end-of-range basic block] pointed to by TVNBBDPT of VN Table entry VN-list-header; |
| 152 | SET save-EOR-fall-through to TBBSFFTS of BBD EOR-BBD; |
| 154 | SET TBBSFFTS of BBD EOR-BBD to 'no' [the end-of-range of the PERFORM being explored is considered to have no successors]; |
| 156 | SET re-exploring-PERFORM to TPFFLREX of PERFORM Descriptor Table entry P; |
| 158 | IF TPFFLREX of PERFORM Descriptor Table entry P is 'yes' THEN |
| 160 | SET TPFFLREX of PERFORM Descriptor Table entry P to 'no'; |
| 162 | ELSE |
| 164 | Add 1 to TBBNUMPR of BBD SOR-BBD; |
| 166 | SET TBBGFVIS of TBBGFLGS of BBD SOR-BBD to 'yes'; |
| 168 | SET reached-exit to 'no'; |
| 170 | PUSH onto the Search Stack a pointer [offset] to BBD SOR-BBD; |
| 172 | CALL Depth-first-search [to pursue a depth-first search from BBD SOR-BBD.]; |
| 174 | SET TBBSFFTS of BBD EOR-BBD to save-EOR-fall-through; |
| 176 | IF TPFFLNMV of PERFORM Descriptor Table entry P is 'no' OR TPFFLNCP of PERFORM Descriptor Table entry P is 'no' THEN [check that the true range almost equals the linear range] |
| 178 | DO for each BBD B in the linear range; |
| 180 | IF TBBGFVIS of BBD B is 'no' AND TBBGFLBL of BBD B is 'yes' AND TBBGFUGO of BBD is 'no' THEN |
| 182 | DO; |
| 184 | SET TPFFLNMV of PERFORM Descriptor Table entry P to 'yes'; |
| 186 | SET TPFFLNCP of PERFORM Descriptor Table entry P to 'yes'; |
| 188 | END; |
| 190 | END; |
| 200 | DO for each BBD that was just visited in the depth-first search; |
| 202 | SET TBBGFVIS of BBD B to 'no'; |
| 204 | END; |
| 206 | IF reached-exit is 'no' THEN |
| 208 | Give diagnostic; |
| 210 | IF PERFORM-loop is 'yes' THEN |
| 212 | DO; |
| 214 | SET PERFORM-loop to 'no'; |
| 216 | SET PERFORM-quit to 'yes'; |
| 218 | Give diagnostic; |
| 220 | END; |
| 222 | IF PERFORM-return is 'yes' THEN |
| 224 | DO; |
| 226 | SET PERFORM-return to 'no'; |
| 228 | SET PERFORM-quit to 'yes'; |
| 230 | Give diagnostic; |
| 232 | END; |
| 234 | SET TPFFLEXP of PERFORM Descriptor Table entry P to 'yes'; |
| 236 | SET TPFFLVIS of PERFORM Descriptor Table entry P to 'no'; |
| 238 | DO for each PERFORM Descriptor Table entry PC in closure; |
| 240 | Let VN-list-PC be the list of VN Table entries whose head is pointed to by TPFVNPTR of PERFORM Descriptor Table entry PC; |
| 242 | Let VN-PC be the VN Table entry in VN Table entry list VN-list-PC that points back to PERFORM Table entry PC; |
| 244 | SET TVNFLACT of VN Table entry VN-PC to 'no' [to show that the corresponding PERFORM return is no longer active]; |
| 246 | SET TPFFLVIS of PERFORM Descriptor Table entry PC to 'no'; |
| 248 | END; [of DO statement beginning at line 238] |
| 250 | END; [of DO statement beginning at line 128] |
| 252 | END; [of DO statement beginning at line 122] |
| 254 | END; [of DO statement beginning at line 118] |
| 256 | IF PERFORM-quit is 'yes' THEN RETURN; |
| | PERFORM Linkage Assignment [to line 426] |
| 260 | DO for each entry P in the PERFORM Descriptor Table in breadth-first order with respect to the PERFORM called-by graph specified by the TPFCLDBY relation of the PERFORM Descriptor Table [use TPFFLCAP of a PERFORM Descriptor Table entry to determine whether it calls any other PERFORMs; TPFFLCAP will be 'no' if the PERFORM is a root in the PERFORM called-by graph, that is if it doesn't call any other PERFORMs; the search starts from these roots; during this DO statement, which ends at line 372, circularity detected during the depth-first search is diagnosed, and PERFORM optimization terminated]; |
| 262 | Let PFM-BBD be the BBD pointed to be TPFBBDPT of PERFORM Descriptor Table entry P; |
| 264 | Let SOR-BBD be the BBD pointed to by TPFSORPT of PERFORM Descriptor Table entry P; |
| 266 | Let VN-list-header be the VN Table entry pointed to by TPFVNPTR of PERFORM Descriptor Table entry P; |
| 268 | Let EOR-BBD be the BBD [the end-of-range basic block] pointed to be TVNBBDPT of VN Table entry VN-list-header; |
| 270 | Let prior-BBD be the BBD immediately preceding BBD SOR-BBD [null if none]; |
| 272 | IF prior BBD is null OR TBBPFDOU of prior-BBD is 'yes' [control can "drop in" to BBD SOR-BBD] THEN |
| 274 | SET TPFFLNMV of PERFORM Descriptor Table entry P to 'yes' [to show that the range cannot be moved in-line]; |
| 276 | IF TPFRNGSZ [the number of instructions in the range] of PERFORM Descriptor Table entry P is greater than copied-range-size-limit THEN |
| 278 | SET TPFFLNCP of PERFORM Descriptor Table entry P to 'yes' [to show that the range cannot be copied in-line]; |
| 280 | IF TBBPFDOU of BBD EOR-BBD is 'yes' [control can fall through to the BBD immediately following EOR-BBD] THEN |
| 282 | DO; |
| 284 | SET TPFFLSVV of PERFORM Descriptor Table entry P to 'yes' [to show that the PERFORM must save/restore the VN value]; |

TABLE 9A-continued
PERFORM-ANALYSIS

| | |
|---|---|
| 286 | SET TPFFLNMV of PERFORM Descriptor Table entry P to 'yes' [to show that the range cannot be moved in-line]; |
| 288 | END; |
| 290 | IF TPFFLSVL of PERFORM Descriptor Table entry P is 'yes' [meaning that the PERFORM linkage register must be saved/restored if it is used by this PERFORM] AND TPFFLSVV of PERFORM Descriptor Table entry P is 'no' THEN |
| 292 | SET TPFFLNBL of PERFORM Descriptor Table entry P to 'yes' ["BAL, no save" cannot be used, so switch to "No BAL, no save" (in preference to "BAL, save ")]; |
| 294 | IF TBBNUMPR of SOR-BBD is greater than 1 THEN |
| 296 | SET TPFFLNMV of PERFORM Descriptor Table entry P to 'yes' [to show that the range may not be moved in-line]; |
| 298 | Let closure be the set of PERFORM Descriptor Table entries in the transitive closure of TPFCLDBY of PERFORM Descriptor Table entry P; |
| 300 | IF closure is not empty THEN |
| 302 | DO; |
| 304 | IF TPFFLNMV of PERFORM Descriptor Table entry P is 'yes' AND TPFFLNCP of PERFORM Descriptor Table entry P is 'yes' AND (TPFFLSVV of PERFORM Descriptor Table entry P is 'no' [meaning that the VN needn't be saved] OR TPFFLNBL of PERFORM Descriptor Table entry P is 'no' [meaning that BAL linkage can be used]) THEN |
| 306 | DO for each PERFORM Descriptor Table entry PC in closure; |
| 308 | IF TPFVNPTR of PERFORM Descriptor Table entry PC points to VN Table entry VN-list-header [if PC can reach P and they both have the same end-of-range] THEN |
| 310 | DO; |
| 312 | SET TPFFLSVV of PERFORM Descriptor Table entry P to 'yes' [to show that the end-of-range VN must be saved/restored]; |
| 314 | SET TPFFLNBL of PERFORM Descriptor Table entry P to 'yes' [to show that BAL linkage CANNOT be used]; |
| 316 | LEAVE [DO, at line 306]; |
| 318 | END; [DO at line 310] |
| 320 | END; [DO at line 306] |
| 322 | DO for each PERFORM Descriptor Table entry PC in closure; |
| 324 | IF TPFFLSVC of PERFORM Descriptor Table entry P is 'yes' THEN |
| 326 | SET TPFFLSVC of PERFORM Descriptor Table entry PC to 'yes' [Lines 324 and 326 are used to handle format 2 PERFORMs]; |
| 328 | IF TPFFLSVL of PERFORM Descriptor Table entry P is 'yes' OR (TPFFLNBL of PERFORM Descriptor Table entry P is 'no' AND TPFFLNMV of PERFORM Descriptor Table entry P is 'yes' AND TPFFLNCP of PERFORM Descriptor Table entry P is 'yes') THEN |
| 332 | SET TPFFLSVL of PERFORM Descriptor Table entry PC to 'yes'; |
| 334 | END; [DO, at line 322] |
| 336 | END; [DO, at line 302] |
| 338 | DO for each VN Table entry VE in the list whose head is VN-list-header; |
| 340 | Let PV be the PERFORM Descriptor Table entry, different from P, pointed to be TVNPNPFM of VN Table entry VE; |
| 342 | IF TPFFLNMV of PERFORM Descriptor Table entry P is 'yes' AND TPFFLNCP of PERFORM Descriptor Table entry P is 'yes' [meaning that the range cannot be moved/copied in-line] THEN |
| 346 | IF TPFFLSVV of PERFORM Descriptor Table entry P is 'yes' OR TPFFLNBL of PERFORM Descriptor Table entry P is 'yes' [meaning that P will use the VN linkage mechanism] THEN |
| 348 | SET TPFFLNBL of PERFORM Descriptor Table entry PV to 'yes' [thereby forcing PV to use the VN linkage mechanism also]; |
| 350 | ELSE; |
| 352 | ELSE |
| 354 | IF TPFFLNMV of PERFORM Descriptor Table entry P is 'no' OR TBBPFDEL of SOR-BBD is 'yes' [meaning that the PERFORM range will be moved/copied and also deleted from its original position] THEN |
| 356 | SET TPFFLSVV of PERFORM Descriptor Table entry PV to 'yes' [other PERFORMs that have the same VN as P and are not moved/copied in-line must save the VN]; |
| 358 | END; [DO statement, line 338] |
| 372 | END; [of DO statement beginning at line 260] |
| 374 | DO for each VN Header Table entry VN-header; |
| 376 | Let EOR-BBD be the BBD pointed to by TVNBBDPT of VN-header; |
| 382 | Let VN-list be the list of VN Table entries pointed to by TVNLSTHD of VN-header; |
| 384 | SET TVNHFBAL of VN-header to 'no'; |
| 386 | SET TVNHFLOD of VN-header to 'no'; |
| 388 | SET TBBPFEOR of EOR-BBD to 'no' [assume no PERFORM return code is required]; |
| 390 | DO for each VN Table entry VN-entry in VN-list; |
| 392 | IF TVNFLPFM of VN-entry is 'yes' [this is for a PERFORM end of range] THEN |
| 394 | DO; |
| 396 | Let PV be the PERFORM Descriptor Table entry pointed to by TVNPNPFM of VN-entry; |
| 398 | IF TPFFLNMV of PERFORM Descriptor Table entry PV is 'yes' AND TPFFLNCP of PERFORM Descriptor Table entry PV is 'yes' THEN |
| 400 | DO; |
| 402 | SET TBBPFEOR of EOR-BBD to 'yes' [to indicate that PERFORM return should be generated]; |
| 404 | SELECT; |
| 406 | WHEN TPFFLNBL of PV is 'yes' |
| 408 | SET TVNHFLOD of VN-header to 'yes'; |
| 410 | WHEN TPFFLSVV of PV is 'yes' |
| 412 | SET TVNHFBAL of VN-header to 'yes'; |
| 414 | OTHERWISE |
| 416 | Leave TVNHFLOD and TVNHFBAL settings as they are; |
| 418 | END; [of SELECT statement at line 404] |
| 420 | END; [of DO statement at line 400] |
| 422 | END; [of DO statement at line 394] |
| 424 | END; [of DO statement at line 390] |
| 426 | END; [of DO statement at line 374] |
| 428 | END PERFORM-analysis; |

TABLE 10
DEPTH-FIRST-SEARCH: PROCEDURE;

Depth-first-search: PROCEDURE;
[Pursues a depth-first search of connected components of a program control flow graph represented by the BBD table 40 ignoring control flow from PERFORMs ]

| | |
|---|---|
| 430 | DO UNTIL the search stack is empty; |
| 431 | Let current BBD be the BBD denoted by DFSBBDPT of the topmost search stack entry; |
| 432 | Get next successor of the current BBD; [set a pointer CSUCCPTR to the next successor of the BBD described by DFSBBDPT of the top stack entry; CSUCCPTR is null if there are no more successors.] |
| 434 | IF CSUCCPTR is not null THEN |
| 436 | DO; |
| 438 | Let current-successor be the BBD pointed to by CSUCCPTR; |
| 440 | CALL Successor-action; |
| 442 | IF TBBGFVIS of BBD current-successor is 'no' THEN |
| 444 | DO; |
| 446 | SET TBBGFVIS of BBD current-successor to 'yes'; |
| 448 | PUSH a new entry on the search stack; |
| 450 | LET new-top-entry be this new entry; |
| 452 | SET DFSNXSUC of new-top-entry to null; |
| 454 | SET DFSBBDPT of new-top-entry to CSUCCPTR; |

TABLE 10-continued

DEPTH-FIRST-SEARCH: PROCEDURE;

| | |
|---|---|
| 456 | END; |
| 458 | END; |
| 460 | ELSE |
| 462 | DO; |
| 464 | CALL POP-action; |
| 466 | POP the entry at the top of the search stack; |
| 468 | END; |
| 470 | END; |
| 472 | END Depth-first-search; |

TABLE 11

SUCCESSOR-ACTION: PROCEDURE;

Successor-action: PROCEDURE;
| | |
|---|---|
| 474 | Let current-successor be the BBD pointed to by CSUCCPTR; |
| 476 | Let top-stack-entry be the entry at the top of the search stack; |
| 478 | Let current-BBD be the BBD pointed to by DFSBBDPT of top-stack-entry; |
| 480 | IF TBBSFFTS of BBD current-successor is 'yes' THEN |
| 482 | SET TBBPFDOU of BBD current-successor to 'yes' [control can "drop out" of BBD current-successor]; |
| 484 | IF the path between the current-BBD and the current-successor has not already been traversed THEN |
| 486 | Add 1 to TBBNUMPR of BBD current-successor [thereby incrementing the predecessor count of the current successor]; |
| 488 | IF TBBPFSOR of BBD current-successor is 'yes' THEN |
| 490 | DO; |
| 492 | SET TBBPFDEL of BBD current-successor to 'no' [to show that if the range is copied in-line in place of PERFORM statements, it cannot also be deleted]; |
| 494 | IF BBD current-successor is the same as the BBD pointed to by TPFSORPT of PERFORM Descriptor Table entry P [the PERFORM that is currently being searched] THEN |
| 496 | SET TPFFLNCP of PERFORM Descriptor Table entry P to 'yes' [to show that the PERFORM range cannot be copied in-line]; |
| 498 | END; |
| 500 | END Successor-action; |

TABLE 12

POP-ACTION: PROCEDURE;

POP-action: PROCEDURE;
| | |
|---|---|
| 502 | Let Let POP-BBD be the BBD about to be POPped and pointed to by DFSBBDPT of the entry at the top of the search stack; |
| 506 | Add TBBTXCTR of POP-BBD to TPFRNGSZ of PERFORM Descriptor Table entry P [thereby incrementing the range size count by the number of instructions in POP-BBD]; |
| 508 | IF TBBGFLBL of BBD POP-BBD is 'yes' [the block contains a referenced label] AND BBD POP-BBD is not the same as SOR-BBD [POP-BBD isn't the start-of-range for the PERFORM being explored] THEN |
| 512 | SET TPFFLNCP of PERFORM Descriptor Table entry P to 'yes' [in an alternative embodiment, it may be desirable to renumber GNs in the range]; |
| 514 | IF TBBPFRRC of BBD POP-BBD is 'yes' [the PERFORM Branch and Count (BCT) register, in System/370, is corrupted in the block] THEN |
| 516 | SET TPFFLSVC of PERFORM Descriptor Table entry P to 'yes' [to show that the Format 2 PERFORM branch and count register must be saved]; |
| 518 | IF TBBPFRRL of BBD POP-BBD is 'yes' [the PERFORM linkage register is corrupted in the block] THEN |
| 520 | SET TPFFLSVL of PERFORM Descriptor Table entry P to 'yes' [to show that the PERFORM linkage register must be saved]; |
| 522 | IF TBBHFHDR of BBD POP-BBD is 'yes' [POP-BBD |

TABLE 12-continued

POP-ACTION: PROCEDURE;

| | |
|---|---|
| | describes a PERFORM] THEN |
| 524 | DO; |
| 526 | SET TPFFLCAP of PERFORM Descriptor Table entry P to 'yes' [to show that this PERFORM P calls another PERFORM]; |
| 528 | Let reached-PERFORM be the PERFORM Table entry pointed to by TBBSCVAL of BBD POP-BBD; |
| 530 | Let calling-PERFORMs be the list of PERFORM Descriptor Table entries denoted by TPFCLDBY of PERFORM Descriptor Table entry reached-PERFORM; |
| 532 | IF TPFFLVIS of PERFORM Descriptor Table entry reached-PERFORM is 'yes' [meaning that reached-PERFORM itself reaches PERFORM Descriptor Table entry P, the PERFORM that we are currently exploring, we have a PERFORM loop] THEN |
| 534 | SET PERFORM-loop to 'yes'; |
| 536 | ELSE |
| 538 | IF PERFORM Descriptor Table entry P is not already in calling-PERFORMs THEN |
| 540 | DO; |
| 542 | Add to calling-PERFORMs a pointer to PERFORM Descriptor Table entry P; |
| 544 | IF TPFFLEXP of PERFORM Descriptor Table entry reached-PERFORM is 'yes' THEN |
| 546 | SET TPFFLREX of PERFORM Descriptor Table entry reached-PERFORM to 'yes' [so it will be re-explored]; |
| 548 | IF reached-PERFORM is "to the left of" PERFORM Descriptor Table entry P [that is, the "DO for each PERFORM" loop has already encountered reached-PERFORM] THEN |
| 550 | SET had-unexplored-PERFORMs to 'yes'; |
| 552 | END; |
| 558 | END; |
| 560 | IF TBBGFRTN of POP-BBD is 'yes' [meaning that POP-BBD terminates with an EXIT PROGRAM or GOBACK statement] THEN |
| 562 | SET PERFORM-return to 'yes' [indicating that there is a potential loop in the control flow]; |
| 564 | IF TBBPFEOR of BBD POP-BBD is 'yes' THEN |
| 566 | IF BBD POP-BBD is the same as BBD EOR-BBD [it is the end-of-range BBD for the PERFORM being explored] THEN |
| 568 | SET reached-exit to 'yes'; |
| 570 | ELSE [we have encountered another PERFORM's end-of-range] |
| 572 | SET TPFFLSVL of PERFORM Descriptor Table entry P to 'yes' [we must assume the other PERFORM may use, and thus corrupt, the PERFORM linkage register, so this PERFORM must save it]; |
| 574 | IF POP-BBD precedes the BBD pointed to by TPFSORPT of PERFORM Descriptor Table entry P [start of range for the PERFORM that we're currently searching] OR POP-BBD follows EOR-BBD THEN |
| 576 | DO; |
| 578 | SET TPFFLNMV of PERFORM Descriptor Table entry P to 'yes' [to show that the range may not be moved in-line]; |
| 580 | SET TPFFLNCP of PERFORM Descriptor Table entry P [to show that the range may not be copied in-line]; |
| 582 | END; |
| 584 | END POP-action; |

TABLE 13

BASIC BLOCK DESCRIPTOR

| 630 | TBBPFHDR | BBD describes PFM stmt header |
|---|---|---|
| 606 | TBBGFLGS | General flags: a 1-bit means: |
| 608 | TBBGFUGO | Block contains only a 'BR 15,' |
| 610 | TBBGFRCH | Control can reach the block |
| 612 | TBBGFVIS | Block visited during search |
| 614 | TBBGFLBL | Block has a referenced label |
| 616 | TBBGFRTN | BBD contains GOBACK/EXIT PGM |
| 618 | TBBPFLGS | PERFORM flags: a 1-bit means: |
| 620 | TBBPFRRC | Format 2 counter reg restricted |
| 622 | TBBPFRRL | BAL linkage reg restricted in BBD |
| 623 | TBBPFDOU | Control can fall out of block |

TABLE 13-continued

| | BASIC BLOCK DESCRIPTOR | |
|---|---|---|
| 624 | TBBPFSOR | BBD is PERFORM start-of-range |
| 626 | TBBPFEOR | BBD is a PERFORM end-of-range |
| 628 | TBBPFDEL | Delete copied/moved range |
| 638 | TBBTXCTR | No. of instructions in block |
| 640 | TBBNUMPR | Predecessor counter |
| 642 | TBBSCSOR | Block successor information |
| 644 | TBBSFLGS | Successor flags, TBBSCVAL is: |
| 646 | TBBSFFTS | Fall-through successor |
| 648 | TBBSCVAL | Pointer to successors |

TABLE 14

| | PERFORM DESCRIPTOR TABLE | |
|---|---|---|
| 701 | TPERFORM | PD entry |
| 62 | TPFREPTR | Procedure integration point |
| 64 | TPFGNPTR | Epilog pointer |
| 702 | TPFBBDPT | Ptr to 1st BBD of PERFORM statement |
| 704 | TPFSORPT | Ptr to start-of-range PN attribute table entry |
| 706 | TPFVNPTR | Ptr to VN table entry for end-of-range BBD |
| 708 | TPFCLDBY | Ptr to PERFORM called-by-entry, zero if not called |
| 710 | TPFRNGSZ | Range size (# elements) |
| 712 | TPFFLAGS | Flags. A 1-bit means: |
| 714 | TPFFLEXP | This PERFORM has been explored |
| 716 | TPFFLSVV | Must save/restore EOR VN value |
| 718 | TPFFLSVL | Must save/restore linkage reg |
| 720 | TPFFLSVC | Must save/restore count reg |
| 722 | TPFFLNBL | BAL linkage cannot be used |
| 724 | TPFFLNCP | Range cannot be copied in-line |
| 726 | TPFFLNMV | Range cannot be moved in-line |
| 728 | TPFFLCAP | This PERFORM calls another |
| 730 | TPFFLREX | Reexplore PERFORM |
| 732 | TPFFLVIS | PERFORM has been visited |

TABLE 15

| | VARIABLE NAME TABLE | |
|---|---|---|
| 749 | TVN | Header entry |
| 750 | TVNBBDPT | Pointer to BBD containing VN def'n |
| 752 | TVNHFLGS | Flags. A 1-bit means: |
| 754 | TVNHFLOD | Use load-VN for PERFORM return |
| 756 | TVNHFBAL | Use BAL-type PERFORM return |
| 758 | TVNLSTHD | Ptr to target-list head |
| 760 | TVNLIST | Target list entry |
| 762 | TVNPNPFM | Ptr to PN or PERFORM tbl entry |
| 764 | TVNFLAGS | Flag byte. A 1-bit means: |
| 766 | TVNFLPFM | TVNPNPFM is PERFORM Table ptr |
| 768 | TVNFLACT | Entry currently active (PFM) |
| 78 | TVNNXTEL | Ptr to next entry; 0=last |

As previously described, the method of the invention comprises a new use for a stored program controlled, digital computer of the type described in U.S. Pat. No. 3,400,371 by G. M. Amdahl, et al, entitled "Data Processing Systems", and in Ibm System/370 Principles of Operation, IBM Publication GA22-7000, the teachings of which are incorporated herein by reference. Such a computing apparatus includes data and program storage areas and registers, and a program execution controller or central processing unit (CPU), which comprise computing resources, the use of which is optimized or improved by use of the method of the invention. The apparatus of the invention includes a stored program controlled digital computer of the type described by Amdahl, et al characterized by the data and control structures described primarily in connection with FIG. 2; also, as characterized by stored program control means operated according to the steps set forth in connection with FIGS. 3-4 and 8-21.

While the invention has been described in connection with preferred embodiments, primarily described as an improved feature or version of a compiler such as the IBM COBOL compiler it is not limited to any such specific product. Consequently, the foregoing and other modifications may be made thereto without departing from the spirit and scope of the invention.

We claim:

1. A method for execution on a digital computer for optimizing the instruction path length in the compilation of COBOL source code, said source code including PERFORM statements and preselected procedures associated therewith, an improvement comprising the steps of:
   (a) ascertaining the control transfer relationship among PERFORM statements and their associated procedures, and characterizing said ascertained relationship in a vector of attributes for each PERFORM statement including whether an associated procedure is OPEN or CLOSED; and
   (b) interpreting the vectors such that if the vector for any given PERFORM statement indicates that:
      (1) the procedure associated therewith is CLOSED, then the code constituting the procedure is substituted for the code constituting the PERFORM statement, or
      (2) the procedure associated therewith is OPEN, then a simplified transfer and return of control code is substituted for the original code constituting the transfer and return of control.

2. A method for execution on a digital computer for optimizing the instruction path length in the compilation of COBOL source code, said source code including at least two PERFORM statements sharing a preselected procedure associated therewith, an improvement comprising the steps of:
   (a) ascertaining the control transfer relationship among the PERFORM statements and the shared associated procedure, and characterizing said ascertained relationship in a vector of attributes for each PERFORM statement including whether the shared procedure contains any externally specified labels within the body of the procedure; and
   (b) interpreting the vectors such that if the vector for any given PERFORM statement indicates both that the procedure does not contain said labels and that the object code size including any substituted for code would not exceed a predetermined size, then replacing the code constituting the procedure for the code of each associated PERFORM statement.

3. A method for execution on a digital computer for optimizing the instruction path length in the compilation of COBOL source code, said source code including at least two PERFORM statements such that one of the PERFORM statements is nested within a preselected procedure associated with the other PERFORM statement, each PERFORM statement having at least one preselected procedure associated therewith, an improvement comprising the steps of:
   (a) ascertaining the nesting of PERFORM statements within their associated procedures, and characterizing said nesting in a called-by graph; and
   (b) substituting the procedure code or substituting a simplified call and return mechanism for each PERFORM statement in the COBOL source code in breadth-first order with respect to said called-by graph so that those PERFORM statements which are nested most deeply within the procedures associated with other PERFORM statements are compiled in depth-nested order.

* * * * *